(12) United States Patent
Denis et al.

(10) Patent No.: US 9,943,924 B2
(45) Date of Patent: Apr. 17, 2018

(54) SYSTEMS AND METHODS FOR WIRELESS CONTROL OF AN ENGINE-DRIVEN WELDING POWER SUPPLY

(71) Applicant: ILLINOIS TOOL WORKS INC., Glenview, IL (US)

(72) Inventors: Marc Lee Denis, Lena, WI (US); Benjamin G. Peotter, Kaukauna, WI (US)

(73) Assignee: Illinois Tool Works Inc., Glenview, IL (US)

( * ) Notice: Subject to any disclaimer, the term of this patent is extended or adjusted under 35 U.S.C. 154(b) by 550 days.

(21) Appl. No.: 14/229,271

(22) Filed: Mar. 28, 2014

(65) Prior Publication Data

US 2015/0273607 A1    Oct. 1, 2015

(51) Int. Cl.
    *B23K 9/10*     (2006.01)
    *F02D 41/26*    (2006.01)
    (Continued)

(52) U.S. Cl.
    CPC .......... *B23K 9/1006* (2013.01); *B23K 9/1087* (2013.01); *F02D 29/06* (2013.01);
    (Continued)

(58) Field of Classification Search
    CPC ...... B23K 9/095; B23K 9/0953; B23K 9/124; B23K 9/1056; B23K 9/1006; B23K 9/1087; B23K 9/1062
    See application file for complete search history.

(56) References Cited

U.S. PATENT DOCUMENTS 2,043,331 A    6/1936    Robert
2,175,891 A    10/1939   Graham
(Continued)

FOREIGN PATENT DOCUMENTS

CN    1538306    10/2004
CN    1746833    3/2006
(Continued)

OTHER PUBLICATIONS

"Miller PC-300 Owner's Manual", Aug. 1989 (Aug. 1989), http://igor.chudov.com/manuals/Miller/Miller-PC-300-Pulse-Control_Manual.pdf.
(Continued)

*Primary Examiner* — Brian Jennison
(74) *Attorney, Agent, or Firm* — McAndrews, Held & Malloy, Ltd.

(57) ABSTRACT

Embodiments described herein include wireless control of a welding power supply via portable electronic devices. In particular, operating parameters and statuses of the welding power supply may be modified by the portable electronic device, as well as be displayed on the portable electronic device. For example, in certain embodiments, the welding power supply may be an engine-driven welding power supply, and the portable electronic device may be configured to start and/or stop an engine of the engine-driven welding power supply. A pairing procedure may be used to pair the welding power supply and the portable electronic device in a wireless communication network. Furthermore, in certain embodiments, a method of prioritization of control between a control panel of the welding power supply and the portable electronic device may be implemented.

51 Claims, 8 Drawing Sheets

(51) Int. Cl.

| | | |
|---|---|---|
| *F02N 11/08* | (2006.01) | |
| *F02D 29/06* | (2006.01) | |
| *F02N 11/12* | (2006.01) | |
| *F02N 11/14* | (2006.01) | |
| *H04W 12/08* | (2009.01) | |
| *F02D 41/22* | (2006.01) | |
| *F02D 31/00* | (2006.01) | |
| *H04L 29/06* | (2006.01) | |
| *H04W 12/04* | (2009.01) | |

(52) U.S. Cl.
CPC ........ *F02D 41/266* (2013.01); *F02N 11/0807* (2013.01); *F02N 11/0818* (2013.01); *F02N 11/12* (2013.01); *F02N 11/14* (2013.01); *F02D 31/001* (2013.01); *F02D 41/22* (2013.01); *F02D 2041/228* (2013.01); *F02D 2400/06* (2013.01); *F02N 2200/00* (2013.01); *F02N 2300/306* (2013.01); *H04L 63/062* (2013.01); *H04W 12/04* (2013.01); *H04W 12/08* (2013.01); *Y02T 10/48* (2013.01)

(56) References Cited

U.S. PATENT DOCUMENTS

| | | | |
|---|---|---|---|
| 2,526,597 A | | 10/1950 | Howard |
| 2,617,913 A | | 11/1952 | Sol |
| 2,642,515 A | | 6/1953 | Bagg |
| 3,567,902 A | | 3/1971 | Stearns |
| 3,992,565 A | | 11/1976 | Gatfield |
| 4,051,344 A | | 9/1977 | Robbins |
| 4,079,231 A | | 3/1978 | Toth |
| 4,093,845 A | * | 6/1978 | Hairgrove, Sr. ..... B23K 9/1087 219/132 |
| 4,147,919 A | | 4/1979 | Matasovic |
| 4,216,367 A | | 8/1980 | Risberg |
| 4,216,368 A | | 8/1980 | Delay |
| 4,227,066 A | | 10/1980 | Bulwidas |
| 4,247,752 A | | 1/1981 | Stringer |
| 4,266,114 A | | 5/1981 | Hansen |
| 4,410,789 A | | 10/1983 | Story |
| 4,450,340 A | | 5/1984 | Corrigall |
| 4,467,174 A | | 8/1984 | Gilliland |
| 4,508,954 A | | 4/1985 | Kroll |
| 4,521,572 A | | 6/1985 | Cuscurida |
| 4,521,672 A | | 6/1985 | Fronius |
| 4,531,045 A | | 7/1985 | Kemp |
| 4,547,855 A | * | 10/1985 | Lanyi ................. B23K 26/0613 219/121.77 |
| 4,561,059 A | | 12/1985 | Davis |
| 4,584,685 A | | 4/1986 | Gajjar |
| 4,641,292 A | | 2/1987 | Tunnell |
| 4,716,274 A | | 12/1987 | Gilliland |
| 4,767,908 A | | 8/1988 | Dallavalle |
| 5,039,635 A | | 8/1991 | Stempin |
| 5,039,835 A | | 8/1991 | Schwiete |
| 5,043,557 A | | 8/1991 | Tabata |
| 5,276,305 A | | 1/1994 | Hsien |
| 5,376,894 A | | 12/1994 | Petranovich |
| 5,406,050 A | | 4/1995 | Macomber |
| 5,653,902 A | | 8/1997 | Chang |
| 5,982,253 A | | 11/1999 | Perrin |
| 6,040,555 A | | 3/2000 | Tiller |
| 6,103,994 A | | 8/2000 | DeCoster |
| 6,156,999 A | | 12/2000 | Ignatchenko |
| 6,365,868 B1 | | 4/2002 | Borowy |
| 6,423,936 B1 | | 7/2002 | Reed |
| 6,458,157 B1 | | 10/2002 | Suaning |
| 6,531,673 B2 | | 3/2003 | Fedorcak |
| 6,570,132 B1 | | 5/2003 | Brunner |
| 6,624,388 B1 | | 9/2003 | Blankenship |
| 6,781,095 B2 | | 8/2004 | Hayes |
| 6,841,752 B2 | | 1/2005 | Ward |
| 6,906,285 B2 | | 6/2005 | Zucker |
| 6,909,285 B2 | | 6/2005 | Jordan |
| 7,045,742 B2 | | 5/2006 | Feichtinger |
| 7,180,029 B2 | | 2/2007 | Ott |
| 7,205,503 B2 | | 4/2007 | Reynolds |
| 7,245,875 B2 | | 7/2007 | Clark |
| 7,336,259 B2 | | 2/2008 | Li |
| 2001/0043656 A1 | | 11/2001 | Koslar |
| 2003/0184515 A1 | | 10/2003 | Tsai |
| 2004/0199846 A1 | | 10/2004 | Matsumoto |
| 2004/0232128 A1 | | 11/2004 | Niedereder |
| 2005/0016975 A1 | | 1/2005 | Reynolds |
| 2005/0152294 A1 | | 7/2005 | Yu |
| 2005/0155068 A1 | | 7/2005 | Chang |
| 2005/0197115 A1 | | 9/2005 | Clark |
| 2005/0230372 A1 | | 10/2005 | Ott |
| 2005/0263511 A1 | | 12/2005 | Fosbinder |
| 2005/0263513 A1 | | 12/2005 | Leisner |
| 2006/0077046 A1 | | 4/2006 | Endo |
| 2006/0138113 A1 | | 6/2006 | Ott |
| 2006/0163227 A1 | | 7/2006 | Hillen |
| 2006/0213892 A1 | | 9/2006 | Ott |
| 2006/0276288 A1 | | 12/2006 | Iwanaka |
| 2007/0080150 A1 | * | 4/2007 | Albrecht ................. B23K 9/10 219/130.01 |
| 2007/0080152 A1 | | 4/2007 | Albrecht |
| 2007/0114216 A1 | | 5/2007 | Ott |
| 2008/0003997 A1 | | 1/2008 | Parkkinen |
| 2008/0116186 A1 | * | 5/2008 | Luck ................. B23K 9/1087 219/132 |
| 2009/0013210 A1 | | 1/2009 | McIntosh |
| 2009/0039064 A1 | | 2/2009 | Enyedy |
| 2009/0071949 A1 | | 3/2009 | Harris |
| 2010/0193489 A1 | | 8/2010 | Beeson |
| 2011/0049116 A1 | | 3/2011 | Rappl |
| 2011/0073569 A1 | | 3/2011 | Rappl |
| 2011/0180517 A1 | * | 7/2011 | Schneider ............ B23K 9/1006 219/108 |
| 2012/0026996 A1 | | 2/2012 | Yamaguchi |
| 2012/0065972 A1 | | 3/2012 | Strifler |
| 2012/0265996 A1 | | 10/2012 | Kaal |
| 2013/0091567 A1 | | 4/2013 | Finch |
| 2013/0094551 A1 | | 4/2013 | Ling |
| 2014/0027427 A1 | | 1/2014 | Fosbinder |
| 2014/0048522 A1 | | 2/2014 | Dina |

FOREIGN PATENT DOCUMENTS

| | | |
|---|---|---|
| CN | 101360580 | 2/2009 |
| CN | 102821903 | 12/2012 |
| CN | 103513638 | 1/2014 |
| DE | 19828986 A1 | 12/1999 |
| EP | 0575082 | 12/1993 |
| EP | 1112800 | 7/2001 |
| EP | 1586403 A1 | 10/2005 |
| EP | 1635508 | 3/2006 |
| EP | 1683599 | 7/2006 |
| JP | 61137675 | 6/1986 |
| JP | 4017977 A | 1/1992 |
| JP | 04162964 | 6/1992 |
| JP | 4162964 | 6/1992 |
| JP | 04162966 | 6/1992 |
| JP | 2002054494 | 2/2002 |
| JP | 2003088957 | 3/2003 |
| JP | 2003154455 | 5/2003 |
| JP | 2003191075 | 8/2003 |
| JP | 2003236663 | 8/2003 |
| JP | 2003236669 | 8/2003 |
| JP | 2013193091 | 9/2013 |
| KR | 20130001955 | 1/2013 |
| WO | 9958285 | 11/1999 |
| WO | 02085566 | 10/2002 |
| WO | 03028389 | 4/2003 |

(56) References Cited

FOREIGN PATENT DOCUMENTS

| WO | 2008060753 | 5/2008 |
|---|---|---|
| WO | 2013184593 | 12/2013 |

OTHER PUBLICATIONS

Avocent, "Longview Wireless User Guide", 2005, http://site.i-techcompany.com/DataSheet/Avocent/lv5800UG.pdf.

Echelon, "PL 3120 / PL 3150 Power Line Smart Transceiver Data Book," Version 2, 005-0154-01C.

Heinrich Hackl et al., 'Digitally Controlled GMA Power Sources,' pp. 1-7.

International Search Report from PCT application No. PCT/US2015/010252 dated Mar. 30, 2015, 9 pgs.

International Search Report from PCT application No. PCT/US2015/010257 dated Apr. 2, 2015, 9 pgs.

International Search Report from PCT application No. PCT/US2015/010258 dated Apr. 1, 2015, 9 pgs.

International Search Report from PCT application No. PCT/US2015/010264 dated Mar. 31, 2015, 8 pgs.

Wireless Universal Serial Bus Specification, Revision 1.0, May 12, 2005.

\* cited by examiner

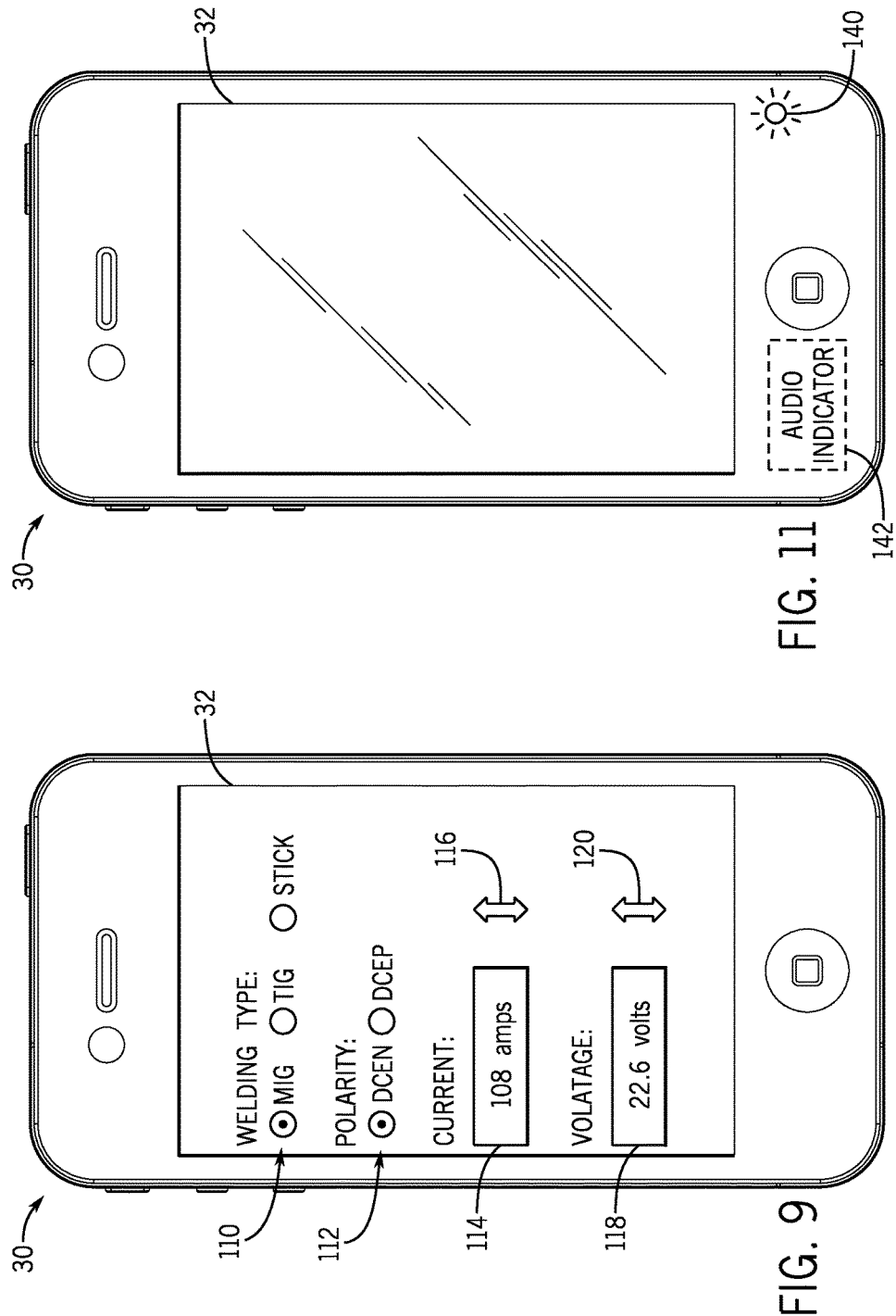

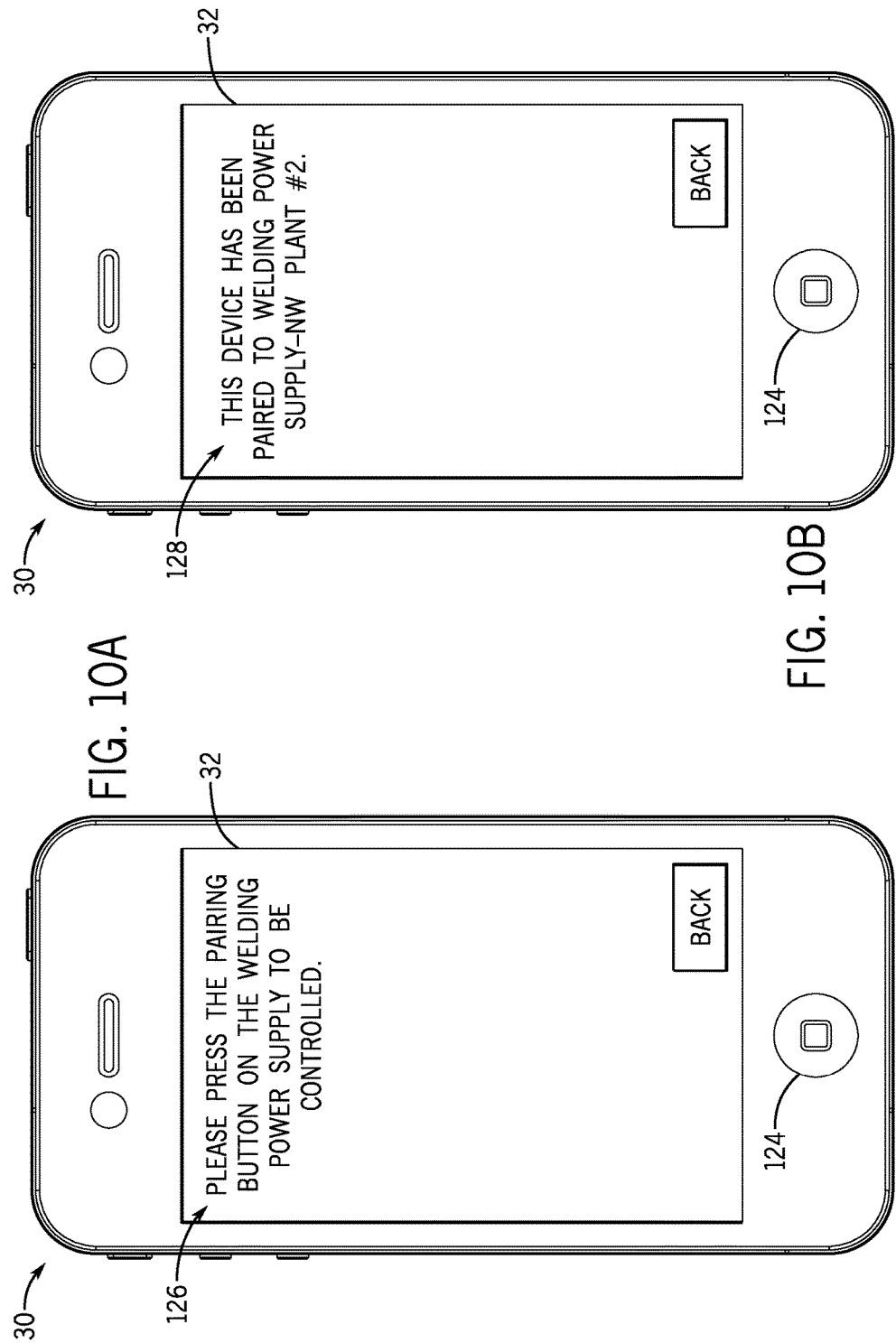

SYSTEMS AND METHODS FOR WIRELESS CONTROL OF AN ENGINE-DRIVEN WELDING POWER SUPPLY

BACKGROUND

The invention relates generally to welding systems and, more particularly, to the use of wireless remote control devices to control welding power supply units.

Welding power supply units are welding systems configured to convert input power to welding output power suitable for use in a welding operation. In certain embodiments, the welding power supply units even generate the power that is converted into the welding output power. Conventionally, welding power supply units are controlled via a control panel disposed on an exterior surface of an enclosure of the welding power supply unit. However, often, welding operators perform welding operations at locations that are at relatively large distances away from the welding power supply units. In such situations, the welding operators often have to walk all the way back to the welding power supply units to modify settings of the welding operations. As such, there is a need for the ability to control welding power supply units from relatively remote locations via wireless remote control devices.

BRIEF DESCRIPTION

Embodiments described herein include wireless control of a welding power supply via portable electronic devices, such as dedicated original equipment manufacturer (OEM) welding remote devices, cellular phones, laptops computers, tablet computers, and so forth. In particular, operating parameters and statuses of the welding power supply may be modified by the portable electronic device, as well as be displayed on the portable electronic device. For example, in certain embodiments, the welding power supply may be an engine-driven welding power supply, and the portable electronic device may be configured to start and/or stop an engine of the engine-driven welding power supply. A pairing procedure may be used to pair the welding power supply and the portable electronic device in a wireless communication network. Furthermore, in certain embodiments, a method of prioritization of control between a control panel of the welding power supply and the portable electronic device may be implemented to ensure that only one of the control panel of the welding power supply and the portable electronic device may be used to control the welding power supply at any given time.

DRAWINGS

These and other features, aspects, and advantages of the present invention will become better understood when the following detailed description is read with reference to the accompanying drawings in which like characters represent like parts throughout the drawings, wherein:

FIG. 9 illustrates the wireless remote control device configured to wirelessly control welding parameters of the engine-driven welding power supply of FIG. 4, in accordance with embodiments of the present disclosure;

Figure 4:
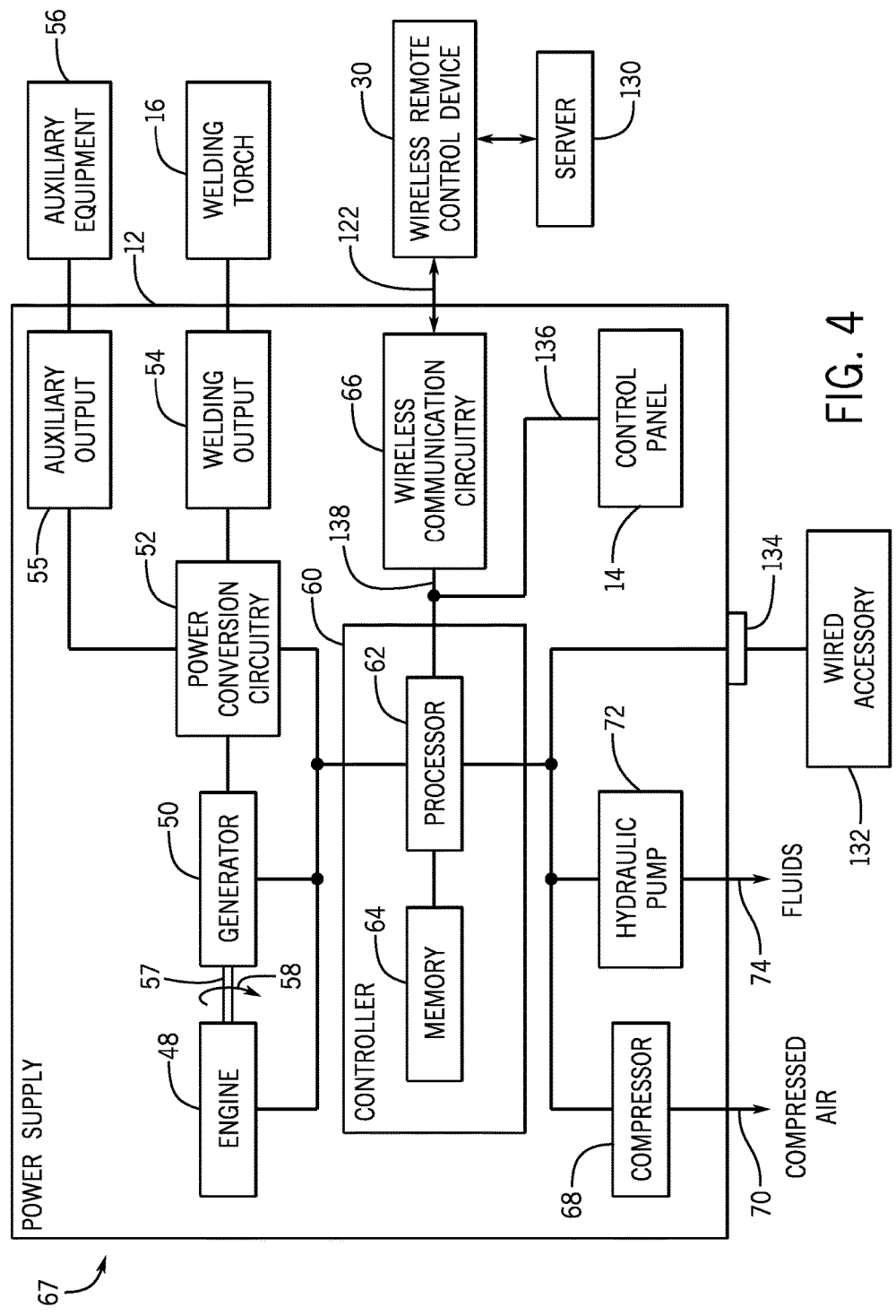
FIG. 4 is a block diagram illustrating exemplary functional components of an embodiment of the engine-driven welding power supply of FIG. 3, in accordance with embodiments of the present disclosure.

FIGS. 10A and 10B illustrate the wireless remote control device configured to initiate pairing of the wireless remote control device with the engine-driven welding power supply of FIG. 4, in accordance with embodiments of the present disclosure; and FIG. 11 illustrates the wireless remote control device configured to implement a find function for the wireless remote control device, in accordance with embodiments of the present disclosure.

DETAILED DESCRIPTION

Figure 1:
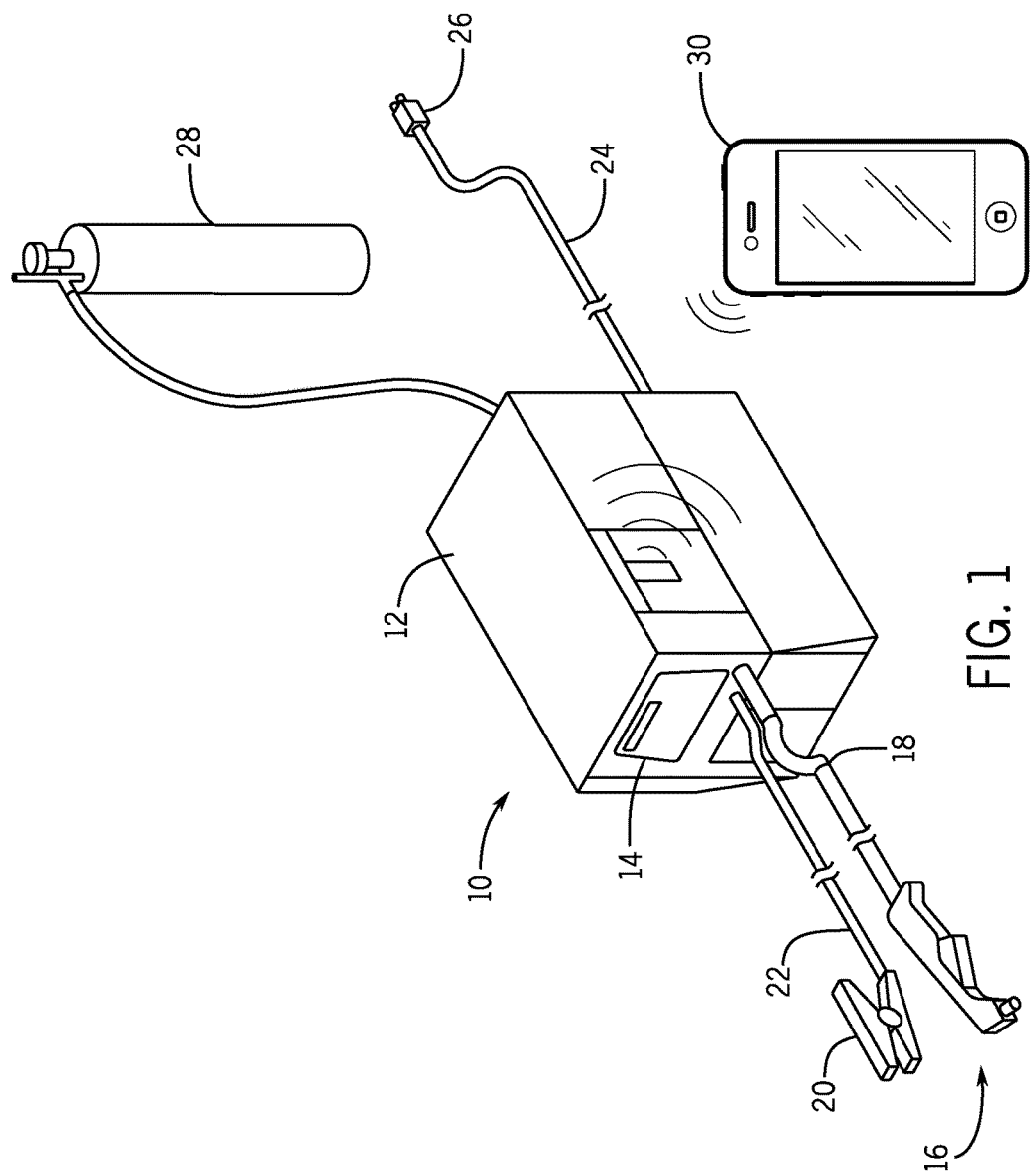
FIG. 1 illustrates a welding-type system configured to communicate wirelessly with a wireless remote control device, in accordance with embodiments of the present disclosure.

FIG. 1 illustrates a welding-type system 10 capable of performing various types of operations. The welding-type system 10 is merely representative of a wide variety of welding-type machines having various sizes, features, and ratings. The welding-type system 10, as contemplated herein, can be configured to not only perform standard welding operations such as tungsten inert gas (TIG), metal inert gas (MIG), and/or stick welding, but can also be capable of performing various cutting operations that are closely associated with the various welding procedures, such as plasma cutting, for example. The welding-type system 10 includes a power supply 12 to condition raw power and generate a power signal suitable for welding applications. The power supply 12 includes a control panel 14 through which an operator may adjust operating parameters of the welding-type system 10. Connected to the power supply 12 is a torch 16 via a cable 18 that provides the torch 16 with power and compressed air or gas, where needed.

Also connected to the power supply 12 is a work clamp 20, which is designed to connect to a workpiece (not shown) to be welded and provide a return path. Connecting the work clamp 20 to the power supply 12 is a cable 22 designed to provide the return path for the welding current from the torch 16 through the workpiece and the work clamp 20. Extending from a rear portion of the power supply 12 is a power cable 24 having a plug 26 for connecting the power supply 12 to either a portable power supply (not shown) or a transmission line power receptacle (not shown). Also connected to the power source is a gas source 28 configured to supply a gas flow to the welding torch 16.

As illustrated in FIG. 1, the power supply 12 may be configured to communicate wirelessly with a wireless remote control device 30, which may be a portable electronic device specifically configured to function as a remote control device for the power supply 12 or may be any type of portable electronic device, such as smart phones, tablet computers, laptop computers, and so forth, that may have software or firmware (as well as security keys) installed thereon to control the power supply 12. In certain embodiments, the wireless remote control device 30 may be used at a welding application location relatively remote from the power supply 12, yet still provide substantially the same display and input devices that the control panel 14 of the power supply 12 provides. In other words, the wireless remote control device 30 may be used as a remote control panel when it is not feasible or practical to use the control panel 14 on the power supply 12. However, it should be noted that the embodiments presented herein enable for additional functionality of the welding power supply 12 to be controlled and/or monitored by the wireless remote control device 30, as described in greater detail herein.

Figure 2:
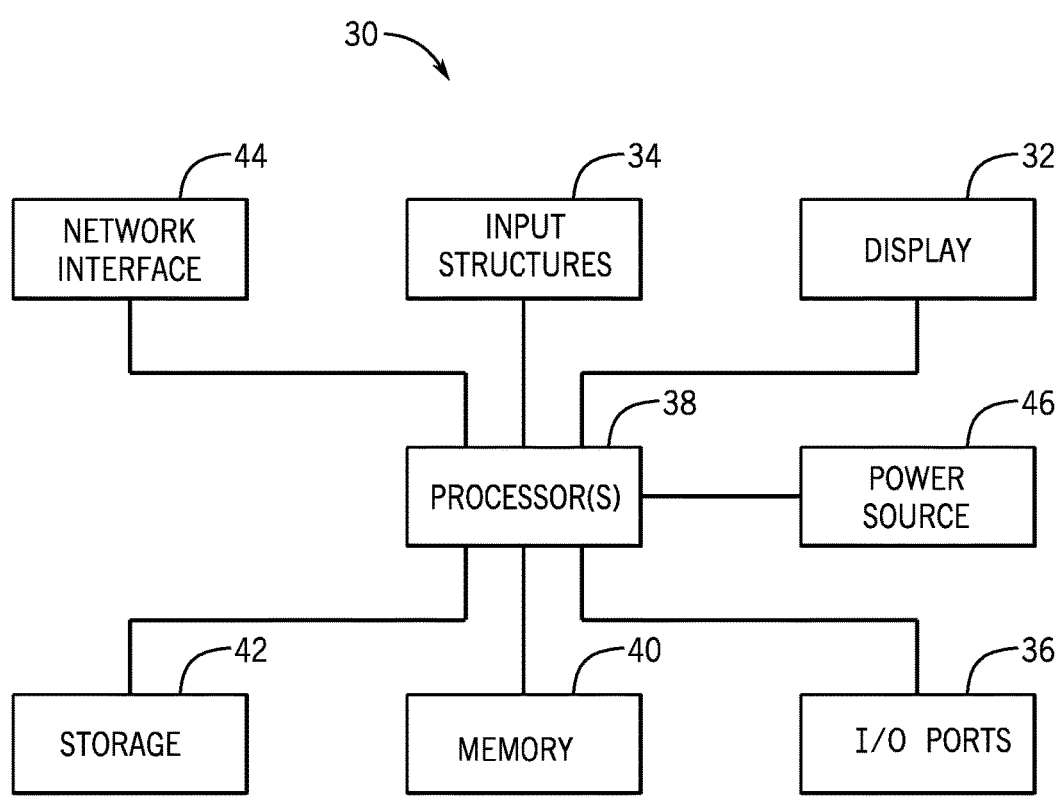
FIG. 2 is a block diagram of a wireless remote control device configured to communicate wirelessly with the welding-type system of FIG. 1, in accordance with embodiments of the present disclosure.

A variety of wireless remote control devices 30 may employ the techniques described herein. FIG. 2, for example, is a block diagram depicting various components that may be present in a suitable wireless remote control device 30 that may be used in the implementation of the present techniques. The wireless remote control device 30 may include a handheld electronic device, a tablet computing device, a notebook computer, and so forth. In other embodiments, the wireless remote control device 30 may include a welding-related device, such as a portable welding wire feeder, a welding helmet, a welding control pendant, a foot pedal, and so forth.

As illustrated in FIG. 2, the wireless remote control device 30 may include, among other things, a display 32, input structures 34, input/output (I/O) ports 36, one or more processor(s) 38, memory 40, nonvolatile storage 42, a network interface 44, and a power source 46. The various functional blocks shown in FIG. 2 may include hardware elements (including certain types of circuitry), software elements (including computer code stored on a non-transitory computer-readable medium), or a combination of both hardware and software elements. It should be noted that FIG. 2 is merely one example of a particular implementation and is intended to illustrate the types of components that may be present in the wireless remote control device 30. Indeed, the various depicted components (e.g., the processor(s) 38) may be separate components, components of a single contained module (e.g., a system-on-a-chip device), or may be incorporated wholly or partially within any of the other elements within the wireless remote control device 30. The components depicted in FIG. 2 may be embodied wholly or in part as machine-readable instructions (e.g., software or firmware), hardware, or any combination thereof.

In the wireless remote control device 30 of FIG. 2, the display 32 may be any suitable electronic display used to display image data (e.g., a liquid crystal display (LCD) or an organic light emitting diode (OLED) display). In some examples, the display 32 may represent one of the input structures 34, enabling users to interact with a user interface of the wireless remote control device 30. In some embodiments, the electronic display 32 may be a touch display that can detect multiple touches at once. Other input structures 34 of the wireless remote control device 30 may include buttons, keyboards, mice, trackpads, rotating knobs, and the like. The I/O ports 36 may enable the wireless remote control device 30 to interface with various other electronic devices.

The processor(s) 38 and/or other data processing circuitry may execute instructions and/or operate on data stored in the memory 40 and/or the nonvolatile storage 42. The memory 40 and the nonvolatile storage 42 may be any suitable articles of manufacture that include tangible, non-transitory computer-readable media to store the instructions or data, such as random-access memory, read-only memory, rewritable flash memory, hard drives, and optical discs. By way of example, a computer program product containing the instructions may include an operating system or an application program. In certain embodiments, the instructions stored in the memory 40 and/or the nonvolatile storage 42 of the wireless remote control device 30 may include software including instructions for enabling the wireless communication with the welding power supply 12, including pairing with the welding power supply 12, enabling prioritization of control between the welding power supply 12 and the wireless remote control device 30, enabling control of the welding power supply 12 via the wireless remote control device 30, and so forth. Furthermore, in certain embodiments, security keys that are used to check whether the wireless remote control device 30 is authorized to communicate with the welding power supply 12, and vice versa, may be stored in the memory 40 and/or the nonvolatile storage 42 of the wireless remote control device 30.

The network interface 44 may include, for example, one or more interfaces for a personal area network (PAN), such as a Bluetooth network, for a local area network (LAN), such as an 802.11x Wi-Fi network or a ZigBee network, and/or for a wide area network (WAN), such as a 4G or LTE cellular network. The power source 46 of the wireless remote control device 30 may be any suitable source of energy, such as a rechargeable lithium polymer (Li-poly) battery and/or an alternating current (AC) power converter.

As mentioned above, the wireless remote control device 30 may take the form of a computer or other type of electronic device. Such computers may generally be portable (such as laptop, notebook, and tablet computers). In other embodiments, the wireless remote control device 30 may be, for example, a portable phone (e.g., a smart phone), a media player, a personal data organizer, or any combination of such devices. In particular, in certain embodiments, the wireless remote control device 30 may be a cellular phone utilizing cellular, Bluetooth, or Wi-Fi to communicate with the power supply 12. In general, the wireless remote control device 30 is a portable electronic device, in other words, handheld or otherwise easily portable by a single human operator.

The wireless communication networking techniques described herein enable seamless and secure exchange of welding parameters, as well as job information and other user data, between the wireless remote control device 30 and the power supply 12. Such wireless communication networking techniques enable welding personnel or other industrial equipment personnel, with little or no experience in areas of communication theory, radio frequency technology, or information technology, to easily assemble and operate wireless communication networks that include a plurality of various equipment and accessories. The wireless communication networking techniques described herein make it easy and intuitive for the aforementioned personnel to manually assemble a wireless network at the job site, and begin using such wireless networks to perform safe and secure control of the welding equipment and accessories, as well as exchange information with other parties in the welding shop or at areas remote from the welding shop.

Figure 3:
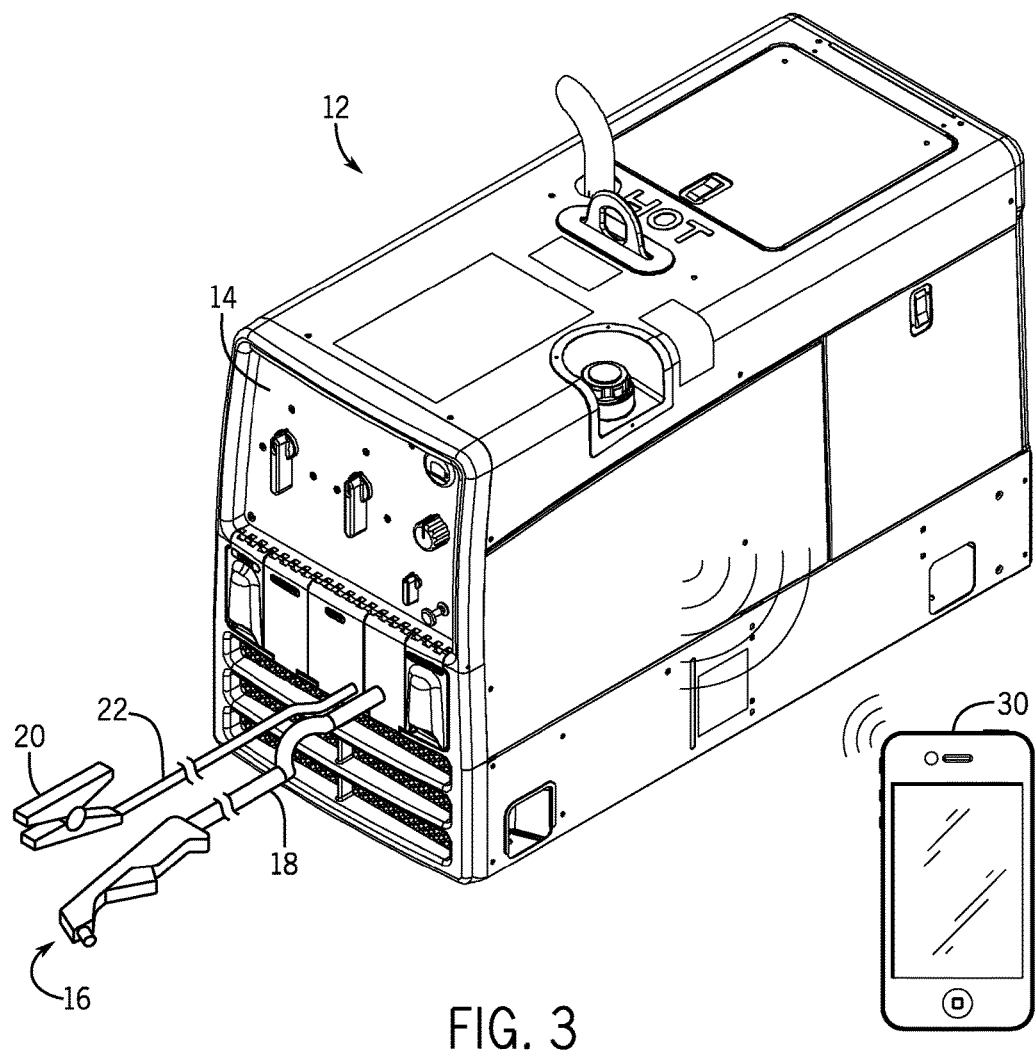
FIG. 3 illustrates an engine-driven welding power supply configured to communicate wirelessly with the wireless remote control device of FIG. 2, in accordance with embodiments of the present disclosure.

As discussed above, the power supply 12 illustrated in FIG. 1 is merely exemplary and not intended to be limiting. For example, in certain embodiments, the power supply 12 may be an engine-driven welding power supply, such as illustrated in FIG. 3. FIG. 4 is a block diagram illustrating exemplary functional components of an embodiment of the engine-driven welding power supply 12. In the illustrated embodiment, instead of utilizing power from an external power source, the engine-driven power supply 12 includes an engine 48, a generator 50, and power conversion circuitry 52 for generating welding power via a welding output 54 for delivery to the welding torch 16 and, in certain embodiments, for generating auxiliary power via an auxiliary output 55 for delivery to auxiliary equipment 56, such as a second welding power supply, lighting systems, grinding machines, and so forth. The generator 50 is coupled to the engine 48 via a shaft 57 that is configured to rotate, as indicated by arrow 58.

The power supply 12 includes a controller 60 configured to control operation of the power supply 12. In particular, in certain embodiments, the controller 60 of the power supply 12 includes one or more processor(s) 62 configured to execute program instructions stored in a tangible non-transitory computer-readable medium, such as the memory 64. For example, in certain embodiments, the memory 64 may store software including instructions for controlling the components of the power supply 12, instructions for interacting with wireless communication circuitry 66 to wirelessly communicate with the wireless remote control device 30, security keys that are used to check whether the wireless communication circuitry 66 is authorized to communicate with the wireless remote control device 30, and vice versa, and so forth. The processor(s) 62 may include a general purpose processor, system-on-chip (SoC) device, application-specific integrated circuit (ASIC), or other processor configuration. Similarly, the memory 64 may include, for example, random-access memory (RAM), read-only memory (ROM), flash memory (e.g., NAND), and so forth.

During operation, a rotor of the generator 50 is driven into rotation within a stator of the generator 50 by the engine 48, thereby generating AC power. That is, the shaft 57 rotates, as shown by arrow 58, to transmit power from the engine 48 to the generator 50. The shaft 57 also connects the engine 48 and the generator 50 for proper alignment while resisting bending and axial loads. The engine 48 and the generator 50 cooperate to generate power that may be converted into the welding power via the welding output 54 and, in certain embodiments, the auxiliary power via the auxiliary output 55 by the power conversion circuitry 52.

The operation of the power supply 12 is regulated and controlled by the controller 60. For example, the controller 60 regulates and controls the operation of the engine 48 via a bi-directional exchange of information between the engine 48 and the controller 60. The controller 60 may receive one or more inputs from the operator via the control panel 14 and may regulate engine performance according to the operator inputs. For instance, a user may specify the type of welding process (e.g., AC stick welding, AC TIG welding, DC stick welding, DC MIG welding, etc.), voltage and/or current settings for the welding process, and so forth, and the controller 60 may determine an appropriate engine speed, among many other operating parameters, based on such inputs. The controller 60 may similarly control operation of the generator 50, the power conversion circuitry 52, and other components of the power supply 12.

As also illustrated in FIG. 4, the power supply 12 includes wireless communication circuitry 66 configured to facilitate wireless communication with the wireless remote control device 30. In certain embodiments, the wireless communication circuitry 66 may include RF communication circuitry, such as RF transmitters and sensors. In other embodiments, a radio subsystem and an associated signaling protocol may be implemented to wirelessly send and receive commands and data between the power supply 12 and the wireless remote control device 30. However, in other embodiments, any suitable means for communicating wirelessly between the power supply 12 and the wireless remote control device 30 may be utilized. In addition, in certain embodiments, the wireless communication circuitry 66 may include one or more processor(s) (i.e., similar to the one or more processor(s) 62 of the controller 60 of the power supply 12) configured to execute program instructions stored in a tangible non-transitory computer-readable medium (i.e., similar to the memory 64 of the controller 60 of the power supply 12) for enabling the wireless communication with the wireless remote control device 30, including pairing with the wireless remote control device 30, enabling prioritization of control between the welding power supply 12 and the wireless remote control device 30, enabling control of the welding power supply 12 via the wireless remote control device 30, and so forth. Furthermore, in certain embodiments, security keys that are used to check whether the wireless communication circuitry 66 is authorized to communicate with the wireless remote control device 30, and vice versa, may be stored in the computer-readable medium of the wireless communication circuitry 66. It will be appreciated that while the controller 60 and the wireless communication circuitry 66 are described herein as being separate components, in certain embodiments, the controller 60 and the wireless communication circuitry 66 may collectively function as integrated control circuitry of the welding power supply 12.

In certain embodiments, all of the components, including the wireless communication circuitry 66, of the welding power supply 12 illustrated in FIG. 4 may be disposed in a common housing (i.e., enclosure) 67. In such embodiments, the wireless communication circuitry 66 functions as the coordinator for the wireless communication network 122 between the welding power supply 12 and the wireless remote control device 30 local to (e.g., resident within) the welding power supply 12, as opposed to having coordination functionality being located remote from (e.g., external to) the welding power supply 12. However, in other embodiments, the wireless communication circuitry 66 may be disposed external to the housing 67 of the welding power supply 12. For example, in certain embodiments, the wireless communication circuitry 66 may be disposed in a separate housing that is configured to directly connect to the welding power supply 12. In particular, the separate housing that encompasses the wireless communication circuitry 66 may include one or more external connectors disposed on the housing that are configured to mate with one or more ports on the welding power supply 12 (e.g., via the control panel 14, for example), thereby enabling the wireless communication circuitry 66 to communicate with the controller 60 of the welding power supply 12, the control panel 14 of the welding power supply 12, and so forth. As such, in certain embodiments, the wireless remote control functionality enabled by the wireless communication circuitry 66 as described herein may be retrofitted into pre-existing welding power supplies 12. It will be appreciated that once such a retrofit communication module is connected to a pre-existing welding power supply 12, the wireless communication circuitry 66 of the retrofit communication module may cooperate with the controller 60, control panel 14, and all other components, of the welding power supply 12 as described herein to enable the wireless control functionality for a wireless remote control device 30.

As previously discussed, although illustrated in FIG. 4 as including an engine-driven welding power supply 12, the wireless remote control protocols and methods described herein may be used with any type of welding power supplies, line-powered, engine-driven, or otherwise. For example, in certain embodiments, as opposed to being an engine-driven welding power supply 12 having an engine 48 that drives a generator 50 to produce power that is converted into welding power via a welding output 54 and, in certain embodiments, auxiliary power via an auxiliary output 55 by the power conversion circuitry 52, the welding power supply 12 may instead receive power from an external source, such as an electrical grid, and the power conversion circuitry 52 may convert this power to the welding power via the welding output 54, the auxiliary power via the auxiliary output 55, and so forth.

In general, all of the components illustrated in FIG. 4 as being included in the welding power supply 12 may be disposed in a common housing or enclosure 67 of the welding power supply 12. For example, in certain embodiments, the welding power supply 12 may include a compressor 68 that is powered by the engine 48 and/or the generator 50, and is utilized to produce compressed air 70 for use in the welding application, without the need for an intermediate storage tank. For example, although not illustrated in FIG. 4, in certain embodiments, the compressor 68 may be coupled to the engine 48 (e.g., directly via a shaft or indirectly via a system of belts) and driven by the engine 48. In other embodiments, the compressor 68 may be directly or indirectly coupled to, and driven by, the generator 50. In addition, in certain embodiments, the welding power supply 12 may include a hydraulic pump 72 that is powered by the engine 48 and/or the generator 50, and is utilized to pump fluids 74 for use in the welding application. For example, although not illustrated in FIG. 4, in certain embodiments, the hydraulic pump 72 may be coupled to the engine 48 (e.g., directly via a shaft or indirectly via a system of belts) and driven by the engine 48. In other embodiments, the hydraulic pump 72 may be directly or indirectly coupled to, and driven by, the generator 50.

Figure 5:
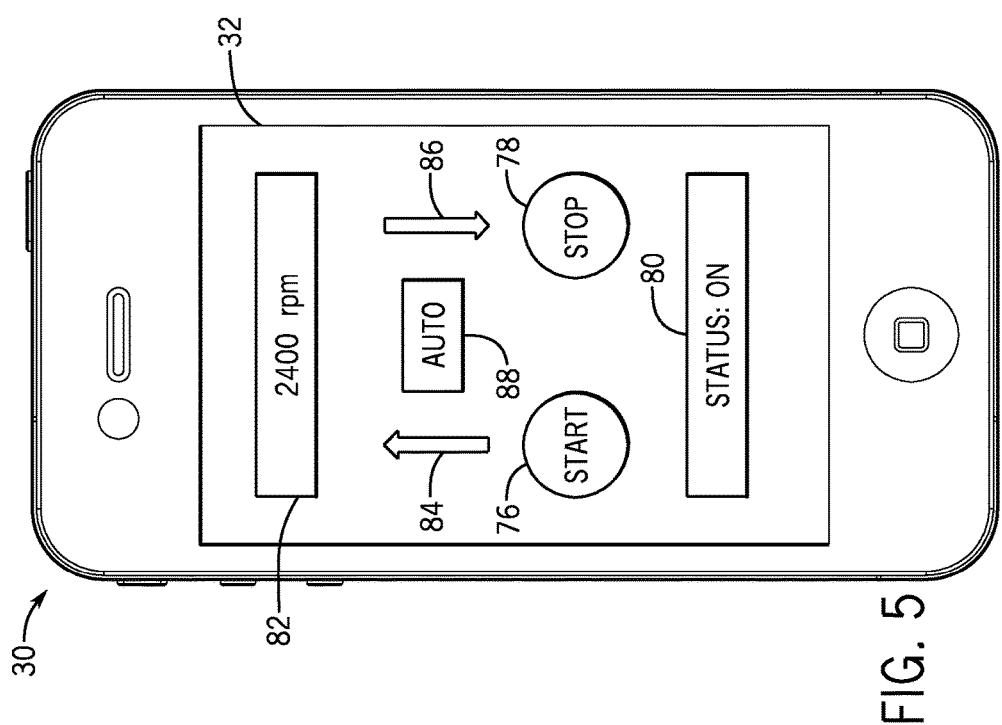
FIG. 5 illustrates the wireless remote control device configured to wirelessly control an engine of the engine-driven welding power supply of FIG. 4, in accordance with embodiments of the present disclosure.

Once the wireless remote control device 30 and the welding power supply 12 are paired with each other, as described in greater detail herein, any number of operational parameters and statuses of the welding power supply 12 may be controlled by the wireless remote control device 30. For example, in certain embodiments, the engine 48 of the welding power supply 12 may be started using the wireless remote control device 30. In such an embodiment, a user of the wireless remote control device 30 may, for example, press a start button on the wireless remote control device 30 or a virtual start button 76 on the display 32 of the wireless remote control device 30, as illustrated in FIG. 5, thereby causing a control signal to be sent wirelessly from the wireless remote control device 30 to the controller 60 of the welding power supply 12 via the wireless communication circuitry 66 of the welding power supply 12. In response to this control signal, based at least in part on the received control signal (as well as other operating parameters, in certain embodiments), the controller 60 may cause the engine 48 of the welding power supply 12 to start, thereby generating power for the welding operation of the welding power supply 12.

Conversely, in certain embodiments, the engine 48 of the welding power supply 12 may also be stopped using the wireless remote control device 30. In such an embodiment, a user of the wireless remote control device 30 may, for example, press a stop button on the wireless remote control device 30 or a virtual stop button 78 on the display 32 of the wireless remote control device 30, as illustrated in FIG. 5, thereby causing a control signal to be sent wirelessly from the wireless remote control device 30 to the controller 60 of the welding power supply 12 via the wireless communication circuitry 66 of the welding power supply 12. In response to this control signal, the controller 60 may cause the engine 48 of the welding power supply 12 to stop, thereby ceasing generation of power for the welding operation of the welding power supply 12. In addition, the current operating status (i.e., ON or OFF) of the engine 48 may be communicated to the wireless remote control device 30 wirelessly from the controller 60 of the welding power supply 12 via the wireless communication circuitry 66, and indicated on an indicator on the wireless remote control device 30 or a virtual indicator 80 on the display 32 of the wireless remote control device 30, as illustrated in FIG. 5.

The following descriptions detail certain specifics relating to remote starting and stopping of the engine 48 of the welding power supply 12. The wireless remote control device 30 may start the engine 48 with the following exemplary sequence. First, the wireless remote control device 30 may be paired with the welding power supply 12, as described in greater detail herein. The welding power supply 12 may be in an OFF position with the engine 48 stopped. The operator may then place the engine 48 in a RUN position. The operator may then press the start button 76 on the wireless remote control device 30, thereby placing the welding power supply 12 in wireless mode while the wireless remote control device 30 sends an engine start request message wirelessly to the controller 60 of the welding power supply 12. In response to this engine start request message, the controller 60 of the welding power supply 12 executes an engine start sequence as governed by local closed loop control. In addition, the controller 60 may send engine RPM data to the wireless remote control device 30 at time intervals to serve as an engine start status indication to the operator via the wireless remote control device 30, where the engine RPM is displayed on the display 32 of the wireless remote control device 30 (e.g., when the engine 48 of the welding power supply 12 reaches its operating RPM, a valid start sequence is indicated). Similarly, to perform an engine stop sequence for the welding power supply 12, the stop button 78 on the wireless remote control device 30 may be pressed, and a message sent to the welding power supply 12, which then performs an engine stop sequence. The engine RPM may again be transmitted to the wireless remote control device 30 to indicate engine status to the operator via the wireless remote control device 30.

In addition to enabling remote starting and/or stopping of the engine 48 of the welding power supply 12, in certain embodiments, the operating speed of the engine 48 may be displayed on the wireless remote control device 30 and controlled via control elements on the wireless remote control device 30. For example, the operating speed of the engine 48 may be communicated to the wireless remote control device 30 wirelessly from the controller 60 of the welding power supply 12 via the wireless communication circuitry 66, and indicated on an indicator of the wireless remote control device 30 or a virtual indicator 82 on the display 32 of the wireless remote control device 30, as illustrated in FIG. 5. Furthermore, in certain embodiments, a user of the wireless remote control device 30 may, for example, manipulate increase/decrease slider elements on the wireless remote control device 30 or virtual increase/decrease slider elements 84, 86 on the display 32 of the wireless remote control device 30, as illustrated in FIG. 5, thereby causing a control signal to be sent wirelessly from the wireless remote control device 30 to the controller 60 of the welding power supply 12 via the wireless communication circuitry 66 of the welding power supply 12, the control signal being used by the controller 60 to increase or decrease the operating speed of the engine 48 of the welding power supply 12 based at least in part on the received control signal (as well as other operating parameters, in certain embodiments).

In addition, in certain embodiments, instead of directly manipulating the operating speed of the engine 48 using the wireless remote control device 30, the user may instead change an operating mode of the engine 48, such as Auto (auto idle) or Run (high speed lock), among others. In other words, instead of the user setting the actual speed of the engine 48 at his discretion, an operating speed mode may instead be selected using the wireless remote control device 30. Examples of the types of engine control modes that may be controlled by the user using the wireless remote control device 30 are described in U.S. Patent Application Publication No. 2010/0193489, entitled "INTEGRATED ENGINE-DRIVEN GENERATOR CONTROL SYSTEM," filed Jan. 30, 2009, which is incorporated herein in its entirety for all purposes.

In addition, in certain embodiments, a means for enabling an auto-start feature when using the wireless remote control device 30 may be implemented. The auto-start feature is used to initiate an engine start if, for example, when in stick welding mode, the operator touches the welding rod to the grounded surface. When such an event occurs, a unique command may be sent from the wireless remote control device 30 to the welding power supply 12, and the engine 48 may be started based at least in part on the command. Other load detections may also initiate the auto-start feature. For example, an engine start may be initiated if a welding arc is detected (e.g., when a battery is used in the welding power supply 12), if a trigger of a MIG welding torch is pressed, if a foot pedal coupled to the welding power supply 12 is depressed for TIG welding, if a TIG welding torch is touched to the grounded surface, if amperage and/or voltage of an auxiliary load is detected, if a load on the compressor 68 is detected (e.g., a compressor pressure or change in compressor pressure is detected), if a load on the hydraulic pump 72 is detected (e.g., a hydraulic pump pressure or change in hydraulic pump pressure is detected), if a low battery condition (e.g., when a battery power level falls below a predetermined threshold) for the welding power supply 12 (or any components connected to the welding power supply 12, for that matter) is detected, and so forth. Furthermore, in certain embodiments, a means for enabling an auto-stop (i.e., auto-shutdown) feature when using the wireless remote control device 30 may be implemented. The auto-stop feature is used to initiate an engine stop based, for example, on weld and load times (e.g., an amount of time without activity of the welding power supply 12, such as welding operations, auxiliary load operations, compressed air delivery operations, hydraulic fluid delivery operations), and so forth.

It will be appreciated that the events occurring in the welding power supply 12 or devices coupled to the welding power supply 12 for enabling the auto-start and auto-stop features may be detected in a number of ways. For example, in certain embodiments, the welding power supply 12 and/or the devices (e.g., stick welding clamp hold a stick welding rod, MIG welding torch, TIG welding torch, foot pedal, auxiliary load, compressor 68, hydraulic pump 72, and so forth) coupled to the welding power supply 12 may include sensors specifically configured to detect the events that initiate the automatic starting and/or automatic stopping of the engine 48.

Furthermore, in certain embodiments, an autospeed selector on the wireless remote control device 30 or a virtual autospeed selector 88 on the display 32 of the wireless remote control device 30, as illustrated in FIG. 5, may be selected or deselected by the user, and an autospeed setting may be sent to the controller 60 of the welding power supply 12 consistent with the selection. In general, when the autospeed setting is selected, the operating speed of the engine 48 of the welding power supply 12 will be automatically determined and established based on current welding operating parameters (e.g., voltage, current, and so forth) of a welding operation being performed by the welding torch 16, auxiliary load requirements, compressed air delivery requirements, hydraulic fluid delivery requirements, battery power levels, and so forth. Conversely, when the autospeed setting is deselected, the operating speed of the engine 48 of the welding power supply 12 will be set at a predetermined value (e.g., at a given speed selected by the user via the increase/decrease slider elements, as described above).

Figure 6:
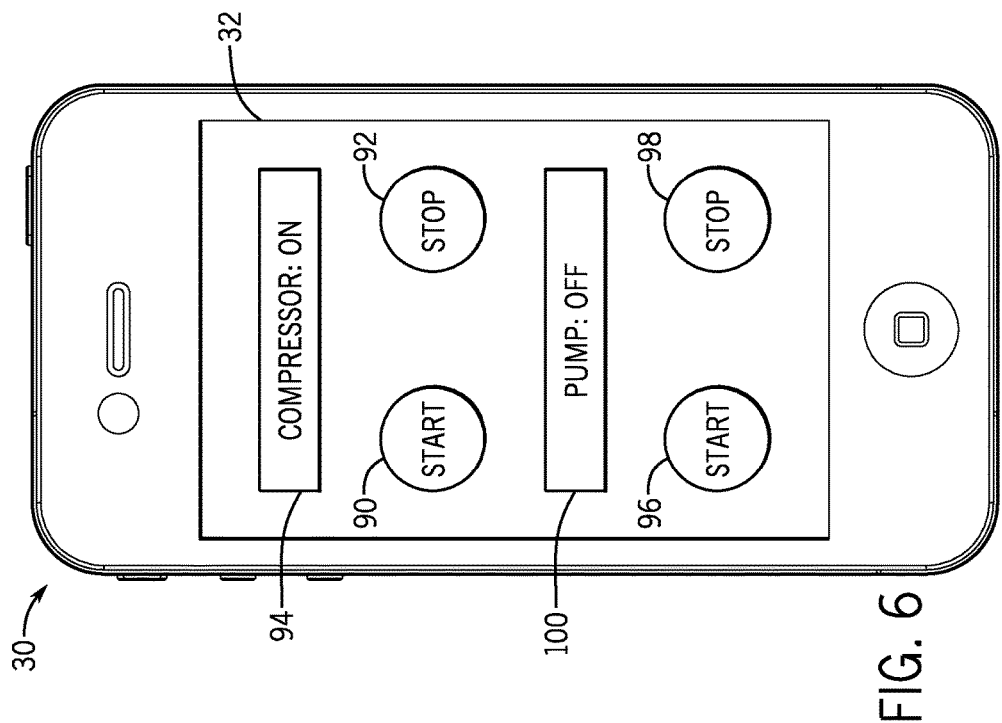
FIG. 6 illustrates the wireless remote control device configured to wirelessly control a compressor and a pump of the engine-driven welding power supply of FIG. 4, in accordance with embodiments of the present disclosure.

In addition to wirelessly controlling operation of the engine 48 of the welding power supply 12, in certain embodiments, the wireless remote control device 30 may be configured to wirelessly control other components of the welding power supply 12. For example, in certain embodiments, the compressor 68 of the welding power supply 12 may be started using the wireless remote control device 30. In such an embodiment, a user of the wireless remote control device 30 may, for example, press a start button on the wireless remote control device 30 or a virtual start button 90 on the display 32 of the wireless remote control device 30, as illustrated in FIG. 6, thereby causing a control signal to be sent wirelessly from the wireless remote control device 30 to the controller 60 of the welding power supply 12 via the wireless communication circuitry 66 of the welding power supply 12. Based at least in part on the received control signal (as well as other operating parameters, in certain embodiments), the controller 60 may cause the compressor 68 of the welding power supply 12 to start.

Conversely, in certain embodiments, the compressor 68 of the welding power supply 12 may also be stopped using the wireless remote control device 30. In such an embodiment, a user of the wireless remote control device 30 may, for example, press a stop button on the wireless remote control device 30 or a virtual stop button 92 on the display 32 of the wireless remote control device 30, as illustrated in FIG. 6, thereby causing a control signal to be sent wirelessly from the wireless remote control device 30 to the controller 60 of the welding power supply 12 via the wireless communication circuitry 66 of the welding power supply 12. Based at least in part on the received control signal (as well as other operating parameters, in certain embodiments), the controller 60 may cause the compressor 68 of the welding power supply 12 to stop.

In addition, the current operating status (i.e., ON or OFF) of the compressor 68 may be communicated to the wireless remote control device 30 wirelessly from the controller 60 of the welding power supply 12 via the wireless communication circuitry 66, and indicated on an indicator on the wireless remote control device 30 or a virtual indicator 94 on the display 32 of the wireless remote control device 30, as illustrated in FIG. 6. It will be appreciated that other operating parameters and statuses of the compressor 68 may be wirelessly controlled by the wireless remote control device 30 and displayed on the wireless remote control device 30. It will further be appreciated that any type of welding power supply 12, line-powered, engine-driven, or otherwise, may include the compressor 68, and that the wireless remote control device 30 may control the compressor 68 as described herein.

Furthermore, in certain embodiments, the hydraulic pump 72 of the welding power supply 12 may be started using the wireless remote control device 30. In such an embodiment, a user of the wireless remote control device 30 may, for example, press a start button on the wireless remote control device 30 or a virtual start button 96 on the display 32 of the wireless remote control device 30, as illustrated in FIG. 6, thereby causing a control signal to be sent wirelessly from the wireless remote control device 30 to the controller 60 of the welding power supply 12 via the wireless communication circuitry 66 of the welding power supply 12. Based at least in part on the received control signal (as well as other operating parameters, in certain embodiments), the controller 60 may cause the hydraulic pump 72 of the welding power supply 12 to start.

Conversely, in certain embodiments, the hydraulic pump 72 of the welding power supply 12 may also be stopped using the wireless remote control device 30. In such an embodiment, a user of the wireless remote control device 30 may, for example, press a stop button on the wireless remote control device 30 or a virtual stop button 98 on the display 32 of the wireless remote control device 30, as illustrated in FIG. 6, thereby causing a control signal to be sent wirelessly from the wireless remote control device 30 to the controller 60 of the welding power supply 12 via the wireless communication circuitry 66 of the welding power supply 12. Based at least in part on the received control signal (as well as other operating parameters, in certain embodiments), the controller 60 may cause the hydraulic pump 72 of the welding power supply 12 to stop.

In addition, the current operating status (i.e., ON or OFF) of the hydraulic pump 72 may be communicated to the wireless remote control device 30 wirelessly from the controller 60 of the welding power supply 12 via the wireless communication circuitry 66, and indicated on an indicator on the wireless remote control device 30 or a virtual indicator 100 on the display 32 of the wireless remote control device 30, as illustrated in FIG. 6. It will be appreciated that other operating parameters and statuses of the hydraulic pump 72 may be wirelessly controlled by the wireless remote control device 30 and displayed on the wireless remote control device 30.

Furthermore, in certain embodiments, the welding output 54 of the welding power supply 12 may be turned on and off (e.g., a contactor, a solid state control, or some other mechanism, may be activated or deactivated) using the wireless remote control device 30. In addition, the current operating status (i.e., ON or OFF) of the welding output 54 may be communicated to the wireless remote control device 30 wirelessly from the controller 60 of the welding power supply 12 via the wireless communication circuitry 66, and indicated on the wireless remote control device 30. It will be appreciated that any type of welding power supply 12, line-powered, engine-driven, or otherwise, may communicate with the wireless remote control device 30 in this manner.

Figure 7:
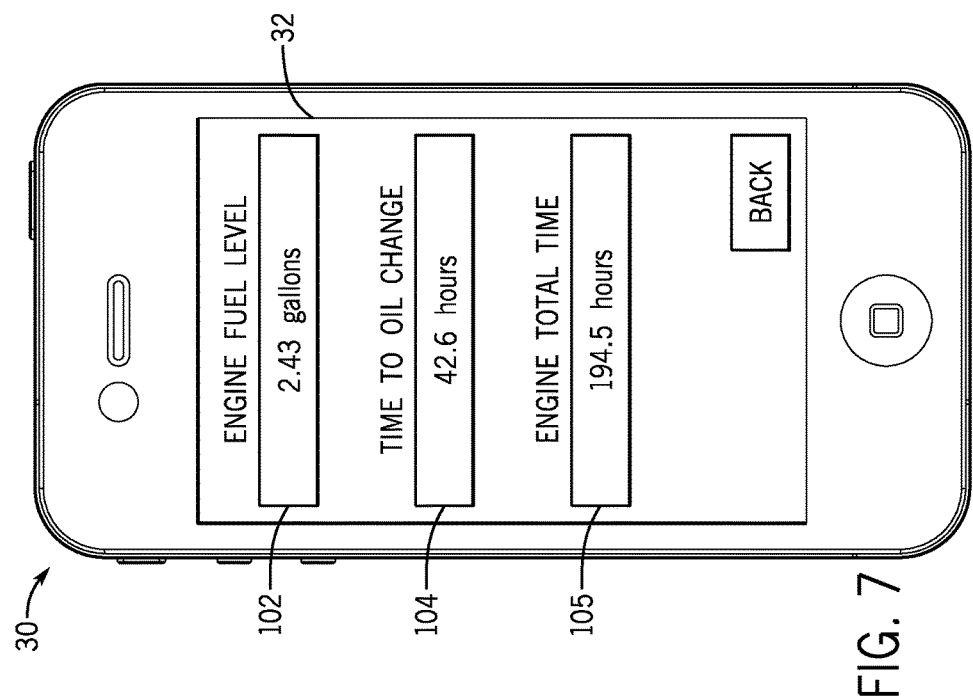
FIG. 7 illustrates the wireless remote control device configured to display operating parameters and statuses of the engine-driven welding power supply of FIG. 4, in accordance with embodiments of the present disclosure.

Many other operating parameters and statuses of the welding power supply 12 may be wirelessly communicated to the wireless remote control device 30 from the controller 60 of the welding power supply 12 via the wireless communication circuitry 66, and displayed on indicators of the wireless remote control device 30 or virtual indicators on the display 32 of the wireless remote control device 30. For example, as illustrated in FIG. 7, in certain embodiments, the current engine fuel level of the engine 48 of the welding power supply 12 may be displayed on a virtual indicator 102 on the display 32 of the wireless remote control device 30. In addition, in certain embodiments, an estimated time until a next scheduled oil change for the engine 48 of the welding power supply 12 may be displayed on a virtual indicator 104 on the display 32 of the wireless remote control device 30. This estimated time may be calculated by the controller 60 of the welding power supply 12 based on oil measurements and/or usage statistics of the engine 48 that are collected by the controller 60. Furthermore, in certain embodiments, the total amount of time (e.g., lifetime hours) the engine 48 has been in use may be displayed on a virtual indicator 105 on the display 32 of the wireless remote control device 30. In addition, in certain embodiments, the total amount of time (e.g., lifetime hours) the welding power supply 12 in general has been in use may also be displayed on the display 32 of the wireless remote control device 30. It will be appreciated that any type of welding power supply 12, line-powered, engine-driven, or otherwise, may communicate with the wireless remote control device 30 in this manner.

Figure 8:
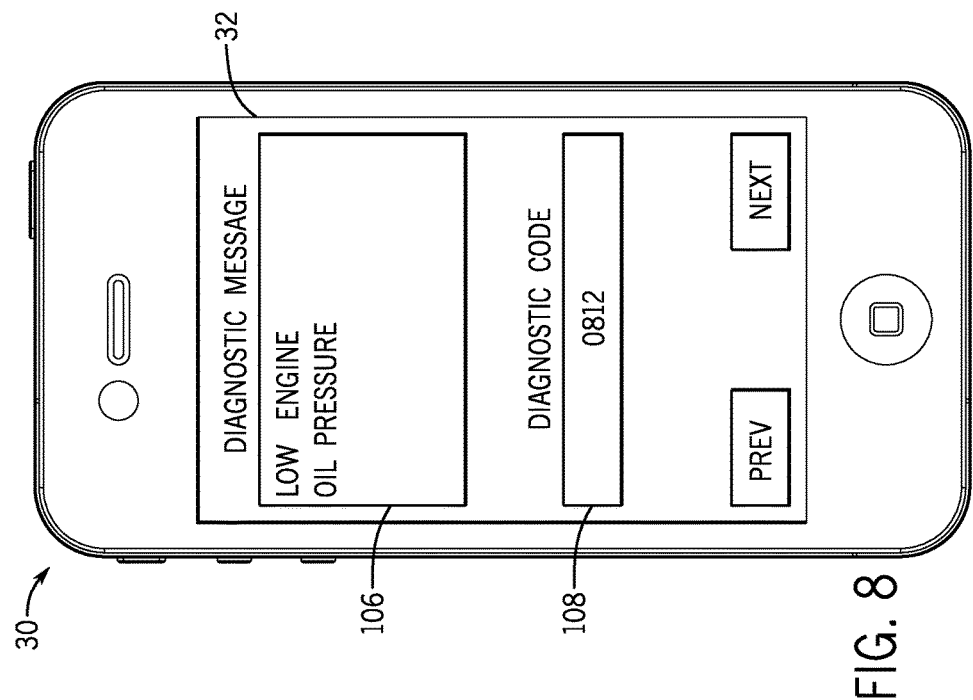
FIG. 8 illustrates the wireless remote control device configured to display diagnostic messages and diagnostic codes of the engine-driven welding power supply of FIG. 4, in accordance with embodiments of the present disclosure.

In addition, as illustrated in FIG. 8, in certain embodiments, engine diagnostic messages and/or diagnostic codes for the engine 48 of the welding power supply 12 may be indicated on virtual indicators 106, 108 on the display 32 of the wireless remote control device 30. It will be appreciated that using the wireless remote control device 30 to wirelessly control the welding power supply 12 may facilitate communication of engine diagnostic messages and/or diagnostic codes that may otherwise not be communicable to the user, for example, via the control panel 14 of the welding power supply 12. For example, in certain embodiments, the control panel 14 of the welding power supply 12 may not include a display capable of displaying detailed diagnostic messages, whereas the display 32 of the wireless remote control device 30 is capable of displaying myriad detailed diagnostic messages.

Indeed, in certain embodiments, all available engine parametrics and diagnostics are available via messages between the welding power supply 12 and the wireless remote control device 30. Examples of such engine parametrics and diagnostics include, but are not limited to, low oil pressure, low or high oil or coolant temperatures, low battery voltage level, low fuel pressure, oxygen sensor readings, excessive total engine hours (e.g., excessive total engine hours since last oil change or service), malfunction codes, and so forth. In certain embodiments, the list of such messages is entirely programmable and can be tailored for the engine 48 of the welding power supply 12. For example, in certain embodiments, for a welding power supply 12 that utilizes electronic fuel injection (EFI), the engine 48 may be manufactured by Kohler and include a serial data bus with streaming data from the Kohler EFI module. In certain embodiments, the wireless communication circuitry 66 facilitates the wireless remote control device 30 having access to (e.g., to assume a master of) the serial data bus of the engine 48. Any or all of the data may be presented to the control electronics (e.g., the controller 60 of the welding power supply 12), stored in local memory (e.g., the memory 64 of the controller 60) for retrieval at a later time, uploaded to an internet-based data server (e.g., using an in-system Wi-Fi, Ethernet, cellular, Bluetooth, ZigBee-to-Internet bridge, etc.) or transmitted to the wireless remote control device 30. Examples of engine parametric and diagnostic data possible include, but are not limited to, engine RPM, engine fuel status or level, total engine hours, expected hours to next service (e.g., such as oil change), engine diagnostic codes (which may vary with the engine 48 used), machine diagnostics codes (such as semiconductor module temperatures), network error codes, and so forth.

Although illustrated in FIG. 8 as relating to engine diagnostic messages and/or diagnostic codes, diagnostic messages and/or diagnostic codes for the welding power supply 12 in general (e.g., temperature too high, current too high, voltage too low or too high, thermistor failure, PC board failure, power supply failure, and so forth), for all of the major components of the welding power supply 12 (e.g., the generator 50, the compressor 68, the hydraulic pump 72, the power conversion circuitry 52, the welding power output 54, the auxiliary power output 55, the controller 60, the wireless communication circuitry 66, and so forth) as well as the devices connected to the welding power supply 12 (e.g., the welding torch 16, the wired accessory 132, and so forth) may be indicated on the display 32 of the wireless remote control device 30. It will be appreciated that any type of welding power supply 12, line-powered, engine-driven, or otherwise, may communicate with the wireless remote control device 30 in this manner.

The information and virtual control elements displayed on the display 32 of the wireless remote control device 30 illustrated in FIGS. 5 through 8 are merely exemplary of the types of information and control elements that may be available on the wireless remote control device 30. In particular, it is noted that all of the information and virtual control elements displayed on the display 32 of the wireless remote control device 30 illustrated in FIGS. 5 through 8 are typical of an engine-driven welding power supply 12. However, as previously discussed, the wireless remote control device 30 may be used to control any type of welding power supply 12, line-powered, engine-driven, or otherwise.

In certain embodiments, the wireless remote control device 30 may be used to wirelessly control operating parameters relating to the welding output 54 of the welding power supply 12, which may affect the delivery of the welding power to the welding torch 16. For example, as illustrated in FIG. 9, in certain embodiments, the type of welding process (e.g., stick, MIG, TIG, etc.) being performed by the welding power supply 12 may be controlled by the wireless remote control device 30. In such an embodiment, a user of the wireless remote control device 30 may select the type of welding process being performed by the welding power supply 12 via a selector on the wireless remote control device 30 or a virtual selector 110 on the display 32 of the wireless remote control device 30, as illustrated in FIG. 9. Based on the selection, a control signal may be sent wirelessly from the wireless remote control device 30 to the controller 60 of the welding power supply 12 via the wireless communication circuitry 66 of the welding power supply 12. In response to this control signal, the controller 60 may change the type of welding process consistent with the selection made by the user via the wireless remote control device 30. It will be appreciated that any type of welding power supply 12, line-powered, engine-driven, or otherwise, may communicate with the wireless remote control device 30 in this manner.

In addition, the polarity (e.g., DCEN, DCEP, and so forth) of the welding process being performed by the welding power supply 12 may be controlled by the wireless remote control device 30. In such an embodiment, a user of the wireless remote control device 30 may select the polarity of the welding process being performed by the welding power supply 12 via a selector on the wireless remote control device 30 or a virtual selector 112 on the display 32 of the wireless remote control device 30, as illustrated in FIG. 9. Based on the selection, a control signal may be sent wirelessly from the wireless remote control device 30 to the controller 60 of the welding power supply 12 via the wireless communication circuitry 66 of the welding power supply 12. In response to this control signal, the controller 60 may change the polarity of the welding process consistent with the selection made by the user via the wireless remote control device 30. It will be appreciated that any type of welding power supply 12, line-powered, engine-driven, or otherwise, may communicate with the wireless remote control device 30 in this manner.

In addition, the current and/or voltage of the welding process being performed by the welding power supply 12 may be displayed on the wireless remote control device 30 and controlled via control elements on the wireless remote control device 30. For example, the welding current being delivered to the welding torch 16 via the welding output 54 of the welding power supply 12 may be communicated to the wireless remote control device 30 wirelessly from the controller 60 of the welding power supply 12 via the wireless communication circuitry 66, and indicated on an indicator of the wireless remote control device 30 or a virtual indicator 114 on the display 32 of the wireless remote control device 30, as illustrated in FIG. 9.

Furthermore, in certain embodiments, a user of the wireless remote control device 30 may, for example, manipulate increase/decrease slider elements (or buttons, knobs, and so forth) on the wireless remote control device 30 or virtual increase/decrease slider elements 116 (or virtual buttons, virtual knobs, and so forth) on the display 32 of the wireless remote control device 30, as illustrated in FIG. 9, thereby causing a control signal to be sent wirelessly from the wireless remote control device 30 to the controller 60 of the welding power supply 12 via the wireless communication circuitry 66 of the welding power supply 12, the control signal being used by the controller 60 to increase or decrease the welding current being delivered to the welding torch 16 via the welding output 54 of the welding power supply 12. It will be appreciated that any type of welding power supply 12, line-powered, engine-driven, or otherwise, may communicate with the wireless remote control device 30 in this manner.

Similarly, the welding voltage being delivered to the welding torch 16 via the welding output 54 of the welding power supply 12 may be communicated to the wireless remote control device 30 wirelessly from the controller 60 of the welding power supply 12 via the wireless communication circuitry 66, and indicated on an indicator of the wireless remote control device 30 or a virtual indicator 118 on the display 32 of the wireless remote control device 30, as illustrated in FIG. 9.

Furthermore, in certain embodiments, a user of the wireless remote control device 30 may, for example, manipulate increase/decrease slider elements on the wireless remote control device 30 or virtual increase/decrease slider elements 120 on the display 32 of the wireless remote control device 30, as illustrated in FIG. 9, thereby causing a control signal to be sent wirelessly from the wireless remote control device 30 to the controller 60 of the welding power supply 12 via the wireless communication circuitry 66 of the welding power supply 12, the control signal being used by the controller 60 to increase or decrease the welding voltage being delivered to the welding torch 16 via the welding output 54 of the welding power supply 12. It will be appreciated that any type of welding power supply 12, line-powered, engine-driven, or otherwise, may communicate with the wireless remote control device 30 in this manner.

Other operating parameters of the welding power supply 12 may be wirelessly controlled by the wireless remote control device 30 and other operating parameters and statuses of the welding power supply 12 may be indicated on the wireless remote control device 30. In other words, the operating parameters and statuses described with respect to FIGS. 5 through 9 are merely exemplary, and not intended to be limiting. For example, in certain embodiments, in addition to displaying and/or controlling welding voltage and welding current via the wireless remote control device 30, welding voltage presets and welding current presets may be displayed and/or controlled via the wireless remote control device 30. In certain embodiments, the presets may be displayed and/or controlled as actual welding voltage preset values or actual welding current preset values, while in other embodiments, the presets may be displayed and/or controlled as percentages of welding voltage or welding current.

It should be noted that the embodiments described herein enable a level of control of such voltage and current preset values that was previously unattainable. In particular, conventional techniques of controlling preset values such as voltage and current generally involve multiple conversions between digital and analog values to implement control of a welding power supply and to convey information to a user relating to such values. More specifically, in conventional techniques, a user might set a preset value for voltage or current using a control knob on a control panel of a welding power supply. The control knob used to adjust the preset value is typically attached to a potentiometer that adjusts an analog input that is used to control the welding power supply. Therefore, the preset value that is set by the user via the control knob is actually merely a reference value that corresponds to a change in an analog position of the potentiometer, rather than an actual preset value for voltage or control. Conversely, any value changes for voltage and current occurring in the welding power supply are communicated back through the control knob and other control elements of the welding power supply via a conversion back from analog positions and, as such, act only as approximations relative to reference values corresponding to these analog positions. As such, these conventional techniques transmit data through multiple digital-to-analog, and vice versa, conversions that may cause significant errors due to drift, offset, scaling, and so forth.

In contrast to these conventional techniques of control, the embodiments described herein enable purely digital information to be communicated between (i.e., both to and from) the wireless remote control device 30 and the welding power supply 12 and, indeed, all the way down to the weld control. As such, all changes in control values, including voltage and current preset values, are input and communicated as the exact digital values that are desired. Similarly, any changes to operational values of the welding power supply 12 are communicated to both the control panel 14 of the welding power supply 12 and the display 32 of the wireless remote control device 30 as more accurate digital values. Indeed, since these values are communicated digitally, they will exactly match each other.

In addition, in certain embodiments, the arc that is created by the welding torch 16 may be controlled via the wireless remote control device 30. This arc control, which may be referred to as Dig, enables a user of the welding power supply 12 to adjust a variable amperage during low voltage (e.g., short arc length) conditions while welding, thereby helping to avoid "sticking" of the electrode when a short arc length is used. Such arc control may include arc force control, pulse timing, induction control, and other arc control settings that facilitate control of the arc. As such, in certain embodiments, an adjustment knob or slider on the wireless remote control device 30 (or a virtual adjustment knob or slider on the display 32 of the wireless remote control device 30) may be adjusted by the user (e.g., to select more or less arc control), thereby generating a control signal that is transmitted wirelessly to the controller 60 of the welding power supply 12, which adjusts an arc control setting that is used to effectuate the arc control that is selected by the user via the wireless remote control device 30 by, for example, adjusting a waveform of the welding power delivered to the welding torch 16 via the welding output 54. It will be appreciated that any type of welding power supply 12, line-powered, engine-driven, or otherwise, may benefit from the control and display capabilities relating to general welding process parameters and statuses as described herein.

Returning now to FIG. 4, it will be appreciated that the network interface 44 of the wireless remote control device 30 and the wireless communication circuitry 66 of the welding power supply 12 are configured to communicate wirelessly with each other using any suitable wireless communication techniques. For example, in certain embodiments, the wireless remote control device 30 and the welding power supply 12 may implement an IEEE 802.15.4 radio subsystem with a ZigBee Pro network stack that is modified to conceal a private network key such that only wireless remote control devices 30 and welding power supplies 12 having the particular type of radio systems may participate in a ZigBee network 122 established between wireless remote control devices 30 and welding power supplies 12.

Before the wireless remote control device 30 may begin controlling the welding power supply 12, the wireless communication network 122 between the wireless remote control device 30 and the welding power supply 12 must first be established. In certain embodiments, to establish the wireless communication network 122 between the wireless remote control device 30 and the welding power supply 12, the wireless remote control device 30 and the welding power supply 12 may first be paired to each other. This pairing may be initialized by first pressing a button 124 (i.e., a first synchronization mechanism) on the wireless remote control device 30, as illustrated in FIG. 10A, or a virtual button (i.e., a first synchronization mechanism) on the display 32 of the wireless remote control device 30. Once the pairing procedure has been initiated, a message 126 may be displayed on the display 32 of the wireless remote control device 30 that informs the user that a similar button (i.e., a second synchronization mechanism) on the welding power supply 12 needs to be pressed to complete the pairing process of the wireless remote control device 30 and the welding power supply 12 into the wireless communication network 122. Once the button (i.e., the second synchronization mechanism) on the welding power supply 12 has been pressed, the network 122 may be established by the wireless communication circuitry 66 of the welding power supply 12, which may function as the network coordinator in certain embodiments, as described in greater detail herein. In addition, a message 128 may be displayed on the display 32 of the wireless remote control device 30 that informs the user that the wireless communication network 122 has been established, as illustrated in FIG. 10B.

In certain embodiments, the pairing of the wireless remote control device 30 and the welding power supply 12 may only be initiated when the synchronization mechanisms (e.g., the buttons or virtual buttons) on the wireless remote control device 30 and the welding power supply 12 are simultaneously activated (e.g., pressed). However, it will be appreciated that in other embodiments, the pairing of the wireless remote control device 30 and the welding power supply 12 may be initiated when the synchronization mechanism on the welding power supply 12 is activated within a given time period (e.g., within 15 seconds, within 10 seconds, within 5 seconds, and so forth) after the initial pairing request from the wireless remote control device 30.

Although initiation of the pairing process has been described as being performed from the wireless remote control device 30, it will be appreciated that in certain embodiments, initiation of the pairing process may be performed from the control panel 14 of the welding power supply 12, with the messages being displayed on a display on the control panel 14, the first button press being on the control panel 14 of the welding power supply 12, and the second button press being on the wireless remote control device 30. Again, in certain embodiments, the pairing of the wireless remote control device 30 with the welding power supply 12 may only be initiated when the synchronization mechanisms (e.g., the buttons or virtual buttons) on the wireless remote control device 30 and the welding power supply 12 are simultaneously activated (e.g., pressed). However, it will be appreciated that in other embodiments, the pairing of the wireless remote control device 30 and the welding power supply 12 may be accomplished when the synchronization mechanism on the wireless remote control device 30 is activated within a given time period (e.g., within 15 seconds, within 10 seconds, within 5 seconds, and so forth) after the initial pairing request from the welding power supply 12.

In addition, in other embodiments, other procedures for initiating pairing between the wireless remote control device 30 and the welding power supply 12 may be used. For example, in certain embodiments, the pairing may be initiated by first pressing the button 124 on the wireless remote control device 30, as illustrated in FIG. 10A, or a virtual button on the display 32 of the wireless remote control device 30. Once the pairing procedure has been initiated, confirmation of activation of the button 124 or the virtual button on the display 32 of the wireless remote control device 30 may be confirmed via the control panel 14 of the welding power supply 12, for example, via a display on the control panel 14 or by activation of a button on the control panel 14. Conversely, in other embodiments, the pairing may be initiated by first pressing a button on the control panel 14 of the welding power supply 12. Once the pairing procedure has been initiated, confirmation of activation of the button on the welding power supply 12 may be confirmed via the display of the wireless remote control device 30.

In other embodiments, the pairing process may be initiated by a user entering certain identifying information (e.g., a serial number, a name, a description, a passcode, and so forth, or any combination thereof) relating to the welding power supply 12 via the display 32 of the wireless remote control device 30. Alternatively, the pairing process may be initiated by a user entering certain identifying information (e.g., a serial number, a name, a description, a passcode, and so forth, or any combination thereof) relating to the wireless remote control device 30 via the control panel 14 of the welding power supply 12. In such embodiments, assuming that both the wireless remote control device 30 and the welding power supply 12 include the appropriate security (e.g., encryption) keys, and that the information entered by the user is correct, the pairing between the wireless remote control device 30 and the welding power supply 12 is allowed.

In yet other embodiments, to facilitate initiation of the pairing process, one or more of the wireless remote control device 30 and the welding power supply 12 may be configured to provide a pairing cue to an operator, and information relating to the cue may be entered in the other of the wireless remote control device 30 and the welding power supply 12. In certain embodiments, the pairing cue may be a visual indication (e.g., a flashing display, special characters on an alphanumeric display, flashing light emitting diodes, characters, or lamps that illuminate, and so forth) or an aural indication (e.g., a buzzer, a loudspeaker with a tone alert or a recorded voice, and so forth). Such embodiments facilitate pairing of welding power supplies 12 that are rack-mounted or otherwise not easily accessible by the operator.

In certain embodiments, once the pairing process has been initiated by either the wireless remote control device 30 or the welding power supply 12, a power level of the wireless communication circuitry 66 (e.g., a power level of a radio transmitter) of the welding power supply 12 may be reduced as a means to avoid inadvertent pairing to unintended devices. In general, once the pairing process has been completed and the wireless communication network 122 has been established between the welding power supply 12 and the wireless remote control device 30, the power level of the wireless communication circuitry 66 may be increased back to a normal level, for example, back to the power level before the pairing process was initiated.

Although many embodiments described herein relate to pairing of a wireless remote control device 30 with a welding power supply 12 that is initiated via manual activation of certain features (e.g., buttons, and so forth) on both of the devices, in other embodiments, the pairing between a wireless remote control device 30 and a welding power supply 12 may be initiated using other methods. For example, a given wireless remote control device 30 may be pre-programmed to be paired with a particular welding power supply 12, or vice versa, when manufactured in a factory. Furthermore, in other embodiments, instead of requiring activation of features on both the wireless remote control device 30 and the welding power supply 12, pairing between the devices may be initiated via a single manual synchronization method. In other words, activation of only a feature on a wireless remote control device 30 may be sufficient to initiate synchronization (i.e., pairing) with a welding power supply 12. In such an embodiment, for example, once a user presses a synchronization button on the wireless remote control device 30, a menu option may be displayed via the display 32 of the wireless remote control device 30, whereby the user can select a welding power supply 12 (from a list of welding power supplies 12 having the requisite security keys, for example) with which to pair the wireless remote control device 30. It will be appreciated that a similar single manual synchronization pairing method may also be implemented from the control panel 14 of the welding power supply 12 as well, whereby the user selects a specific wireless remote control device 30 (from a list of wireless remote control devices 30 having the requisite security keys, for example) with which to pair the welding power supply 12.

In general, only one wireless remote control device 30 may be paired with one welding power supply 12 at any given time (i.e., the wireless remote control device 30 and the welding power supply 12 may only be paired together in a 1:1 pairing relationship). In other words, only one wireless remote control device 30 may be capable of remotely controlling a given welding power supply 12 at any given time, and a given welding power supply 12 may only be capable of being remotely controlled by one wireless remote control device 30 at any given time.

However, in certain embodiments, more than one wireless remote control device 30 may be paired with a given welding power supply 12 at any given time, and these wireless remote control devices 30 may be used to control the welding power supply 12 in tandem. As a non-limiting example, in one embodiment, a wireless foot pedal may be used to control amperage of the welding output 54 of the welding power supply 12 and a wireless pendant may be used to control the type of welding process, starting and/or stopping of the welding power supply 12, and so forth. In such embodiments, a certain type of wireless remote control device 30 may control a certain subset of control features for the welding power supply 12, whereas other types of wireless remote control devices 30 may control other subsets of control features for the welding power supply 12, and the combined subsets of control features may be complementary with each other. In the case where multiple paired wireless remote control devices 30 are both capable of controlling a given feature (e.g., parameter or status) for the welding power supply 12, certain priorities between the multiple paired wireless remote control devices 30 may be stored in the memory 64 of the controller 60, and prioritization of control between the multiple paired wireless remote control devices 30 may be implemented accordingly.

At any given time after the welding power supply 12 and the wireless remote control device 30 have been paired together, a de-pairing procedure may be performed to terminate the pairing between the welding power supply 12 and the wireless remote control device 30. For example, a user may initiate termination of the pairing between a given welding power supply 12 and a paired wireless remote control device 30 by interacting with either the control panel 14 of the welding power supply 12 or the wireless remote control device 30 (e.g., via the display 32 of the wireless remote control device 30). For instance, an option to de-pair the welding power supply 12 from the wireless remote control device 30 may be selected by the user as an option in a menu presented via the display 32 of the wireless remote control device 30 (or, similarly, via the control panel 14 of the welding power supply 12). Once de-pairing is initiated, the controller 60 of the welding power supply 12 may cause the wireless communication circuitry 66 of the welding power supply 12 to terminate the wireless communication network 122 between the welding power supply 12 and the wireless remote control device 30, and signals may be sent to both the control panel 14 of the welding power supply 12 and the wireless remote control device 30 to display to users of the welding power supply 12 and the wireless remote control device 30 that the pairing has been terminated and the wireless communication network 122 between the welding power supply 12 and the wireless remote control device 30 no longer exists.

It will be appreciated that other events may initiate termination of pairing between a given welding power supply 12 and a paired wireless remote control device 30. For example, in the event that the paired wireless remote control device 30 has been outside of the range of the wireless communication network 122 for a certain period of time, the controller 60 of the welding power supply 12 may automatically initiate the de-pairing procedure described above. In such an event, the user of the welding power supply 12 may be provided with a prompt via the control panel 14 of the welding power supply 12 to confirm that the user does, in fact, wish for the pairing between the welding power supply 12 and the wireless remote control device 30 to be terminated. In certain situations, the user may instead wish to leave the wireless communication network 122 in place, and to simply bring the wireless remote control device 30 back into the range of the wireless communication network 122.

In certain embodiments, de-pairing of the wireless remote control device 30 and the welding power supply 12 may not be initiated unless the operator performs an intentional action like re-pairing the wireless remote control device 30 with another welding power supply 12, re-pairing another wireless remote control device 30 to the welding power supply 12, and so forth. Furthermore, the wireless communication network 122 between the paired welding power supply 12 and wireless remote control device 30 is maintained even if the operator turns off the welding power supply 12 or the engine 48 of the welding power supply 12. It will be appreciated that any type of welding power supply 12, line-powered, engine-driven, or otherwise, may utilize the pairing and de-pairing techniques described herein in conjunction with the wireless remote control device 30.

In certain embodiments, once the welding power supply 12 and the wireless remote control device 30 are paired together, the controller 60 of the welding power supply 12 functions as the ZigBee coordinator for the ZigBee network 122 created between the welding power supply 12 and the wireless remote control device 30. In other words, the controller 60 of the welding power supply 12 may be responsible for establishing the ZigBee network 122, maintaining wireless communications via the ZigBee network 122, etc. The ZigBee coordinator functionality of the controller 60 is similar to the functionality of the master node devices described in U.S. patent application Ser. No. 13/795, 639, entitled "WIRELESS COMMUNICATION NETWORK FOR CONTROL OF INDUSTRIAL EQUIPMENT IN HARSH ENVIRONMENTS," filed Mar. 12, 2013, which is incorporated herein in its entirety for all purposes. It should be noted that the ZigBee coordinator functionality need not necessarily reside in the welding power supply 12. Rather, in other embodiments, the ZigBee coordinator functionality may reside in a separate master node device that facilitates communication between the welding power supply 12 and the wireless remote control device 30. In yet other embodiments, the ZigBee coordinator functionality may reside in the wireless remote control device 30. More specifically, the processor 38 of the wireless remote control device 30 may execute instructions stored on its memory 40 that carry out the ZigBee coordinator functionality of network association and security, improved robustness, power management and optimization, sensor data transmission, and so forth.

Furthermore, while the wireless communication network 122 established between the welding power supply 12 and the wireless remote control device 30 may be a ZigBee network 122 (e.g., as message payloads in the 802.15.4 and ZigBee descriptions) in certain embodiments, other types of wireless communication networks may be established between the welding power supply 12 and the wireless remote control device 30, and the network coordinator functionality may be consistent with these other types of wireless communication networks. Any type of radio standard capable of sending packetized data between the welding power supply 12 and the wireless remote control device 30 may be used to implement the wireless communication techniques described herein. In general, in the wireless communication network 122, there exists a so-called "master node", which effects management (i.e., coordination) of the wireless communication network 122. Other nodes may exist in the wireless communication network 122 for the purpose of exchanging signals (e.g., commands, responses, data, and so forth), and these other nodes may assume local network addressing in conjunction with the master node. In some instances, the temporal relationship for data transfers on the wireless communication network 122 (e.g., which node may send data, and when, and for how long, and so forth) is at least partially set by policy by the master node. These policies may vary based on the type of wireless communication network 122. For example, for Wi-Fi networks (IEEE 802.11), the master node is an access point (or wireless access point); for Bluetooth networks (IEEE 802.15.1), there is a master node and a slave node; and for ZigBee networks (IEEE 802.15.4), there is a coordinator that sets the network for a collection of end nodes and routers.

The existing ZigBee and ZigBee Pro network definitions, as embodied in their respective network "stacks" and described within documents published by the ZigBee Alliance (www.zigbee.org) provide for open promiscuous network joining of all devices. However, the control of high-powered electrical equipment such as the welding power supply 12 described herein requires a higher level of security and reliability, both for security of data and for safety use concerns. Accordingly, the embodiments described herein implement more exclusive control over the welding power supply 12 and the types of wireless remote control devices 30 that are allowed to join the wireless communication network 122 and to control the welding power supply 12. In particular, in certain embodiments, a modified version of the released ZigBee Pro software stack may be implemented, with modifications being made to the security provisions, the pairing procedures, and so forth.

More specifically, the generic public ZigBee Pro stack generally allows any ZigBee device to join a network or to use network facilities (i.e., routers) to form a larger mesh network. In contrast, the embodiments described herein restrict all network access to only those devices that are imprinted with security (e.g., encryption) keys. More specifically, in certain embodiments, all wireless communication between the wireless remote control device 30 and the welding power supply 12 (including the pairing procedure) requires that both the wireless remote control device 30 and the welding power supply 12 include security keys stored in memory of the respective devices. During each communication between the wireless remote control device 30 and the welding power supply 12, the devices check that the requisite security keys are present and that the wireless communication may be permitted.

In contrast to conventional techniques, in the embodiments described herein, the security keys are not transmitted between the wireless remote control device 30 and the welding power supply 12. In other words, the security keys are not shared across the wireless communication network 122 between the wireless remote control device 30 and the welding power supply 12. Rather, again, the security keys are either installed in the devices during manufacture (e.g., in the case of the welding power supply 12, where the wireless remote control device 30 is an OEM pendant, and so forth) or are pre-loaded into the device prior to the wireless communication with the other device.

It will be appreciated that, in many embodiments, the welding power supply 12 will be pre-loaded with the security keys (e.g., stored in the memory 64 of the welding power supply 12) when manufactured. In addition, in certain embodiments, the wireless remote control device 30 will be a dedicated OEM welding device that is specifically manufactured to operate with the welding power supply 12 and, as such, will be pre-loaded with the security keys required to operate with the welding power supply 12. In certain embodiments, all wireless remote control devices 30 equipped with Zigbee radios will be pre-loaded at the point of manufacture with a minimal code load, such as a "boot loader" designed to pair with a welding power supply 12, operating as a ZigBee coordinator. During this initial "first pairing", a host servicing the coordinator determines that the wireless remote control device 30 is, for example, an unprogrammed pendant, and then pushes a firmware image of the pendant code (which will operate the welding power supply 12) onto the pendant. When the operator re-starts the pendant, it will then assume the personality of the correct pendant for the welding power supply 12.

It will be appreciated that, in certain embodiments, the security keys and/or the communication software or firmware may be downloaded into the wireless remote control device 30 at a different time other than during manufacture, for example, prior to the pairing process of the welding power supply 12 and the wireless remote control device 30. As an example, returning now to FIG. 4, the security keys and/or the communication software or firmware may be downloaded from a server 130 (e.g., web server, local area network server, and so forth) that the user of the wireless remote control device 30 connects to and, in certain embodiments, logs into using login credentials to provide an added layer of security.

If the wireless remote control device 30 includes the requisite security keys, the wireless communication network 122 may recognize the wireless remote control device 30 and enable pairing of the wireless remote control device 30 with the welding power supply 12. In certain embodiments, once recognized, the controller 60 of the welding power supply 12 may cause a prompt on the display 32 of the wireless remote control device 30 to be displayed that asks for the user of the wireless remote control device 30 to input a passcode that is, for example, displayed on the control panel 14 of the welding power supply 12 to confirm that pairing should proceed.

In general, any wireless remote control device 30 having the requisite security keys will be allowed to join the wireless communication network 122 and be paired to a welding power supply 12. In certain embodiments, for example if the wireless remote control device 30 is a pendant device, the wireless remote control device 30 may only have the software to allow pairing to a coordinator (e.g., a welding power supply 12). In such an embodiment, the coordinator will be programmed to examine the type of the paired wireless remote control device 30 (e.g., whether it is a pressure mat, grinder, general purpose router, universal remote control, and so forth) and, as required, will initiate a code download to the wireless remote control device 30. In such embodiments, the welding power supply 12 will push code (e.g., pendant code) of the latest release (e.g., version) to the wireless remote control device 30 via the wireless communication network 122 to enable the wireless remote control device 30 to control operation of the welding power supply 12. Then, the wireless remote control device 30 is re-started, and it begins operation as a wireless remote controller (e.g., pendant) for the welding power supply 12.

Once the welding power supply 12 and the wireless remote control device 30 have been paired together, thereby establishing the wireless communication network 122 between them, in certain embodiments, the control panel 14 of the welding power supply 12 and the wireless remote control device 30 (e.g., via its display 32) may provide substantially similar functionality for control of the welding power supply 12. In particular, in certain embodiments, a unified, nested menu structure for controlling the welding power supply 12 may be displayed on and manipulated from the control panel 14 of the welding power supply 12 and the display 32 of the wireless remote control device 30. Table 1 illustrates a non-limiting exemplary nested menu structure that may be shared between the welding power supply 12 and the wireless remote control device 30 paired to the welding power supply 12.

TABLE 1

Exemplary nested menu structure

Main Menu
    Mode/Process Select
        Scratch Start TIG
        Lift-Arc TIG
        TIG
        MIG
        Pulsed MIG
        CC
        Stick
    Voltage/Amperage Adjust
    Inductance/Dig Adjust
    Panel/Remote
    Output ON/OFF
    Engine
        Start/Stop
        Auto/Run
        Engine Parameters
    Pairing
    . . .

In general, the menu structure will be dependent upon the type of welding power supply 12 being controlled, or even the specific features available on a welding power supply 12 of a given type. For example, the menu structure for a TIG welding power supply 12 will be different than the menu structure for a multi-process engine-driven welding power supply 12. The menu structure enables the wireless remote control device 30 to generally duplicate the control features available on the welding power supply 12 to which it is paired. Often, the control features available from the wireless remote control device 30 will be limited to those control features available from the welding power supply 12 (e.g., via the control panel 14). However, in certain embodiments, advanced control features may be enabled through the wireless remote control device 30 that are otherwise not available from the welding power supply 12 (e.g., via the control panel 14). For example, additional control features may be presented via the nested menu structure that is presented on the display 32 of the wireless remote control device 30 that are not available via the control panel 14 of the welding power supply 12. Indeed, in certain situations, the wireless remote control device 30 may control a welding power supply 12 having a control panel 14 that does not have a display capable of displaying a substantially similar nested menu structure. It will be appreciated that any type of welding power supply 12, line-powered, engine-driven, or otherwise, may communicate with the wireless remote control device 30 in this manner.

Furthermore, in certain embodiments, the wireless remote control device 30 may be used to add functionality to the welding power supply 12. As a non-limiting example, a user may use the wireless remote control device 30 to select functionality that is added to the welding power supply 12. For example, the user may select a certain advanced welding process, such as a pulsed MIG welding process, via the display 32 of the wireless remote control device 30 as process functionality that is desired by the user but that is not currently enabled in the welding power supply 12. In such a situation, upon selection of the advanced welding process (e.g., via the display 32 of the wireless remote control device 30), the wireless remote control device 30 may wirelessly transmit the functionality (e.g., software) to the welding power supply 12, which may then be stored in the welding power supply 12 (e.g., in the memory 64) and used by the controller 60 of the welding power supply 12, thereby enabling the advanced welding process in the welding power supply 12. Alternatively, in certain embodiments, selection of advanced welding processes by the user via the wireless remote control device 30 may initiate the functionality being downloaded into the welding power supply 12 from an external source such as the server 130, for example. It will be appreciated that any type of welding power supply 12, line-powered, engine-driven, or otherwise, may communicate with the wireless remote control device 30 in this manner.

In certain embodiments, a method for prioritization of control between the control panel 14 of the welding power supply 12 and the wireless remote control device 30 may be used to ensure that only one of the control panel 14 of the welding power supply 12 and the wireless remote control device 30 may be used to control the welding power supply 12 at any given time. In certain embodiments, prioritization of control between the control panel 14 of the welding power supply 12 and the wireless remote control device 30 may be effectuated via an input device (e.g., a switching mechanism, such as a switch, push button, and so forth, in certain embodiments) disposed on the welding power supply 12.

In other embodiments, when the welding power supply 12 is turned off (e.g., in a powered off state) and a user turns the welding power supply 12 on (e.g., places the welding power supply 12 in a powered on state), the electronics (e.g., the control panel 14, the controller 60, the wireless communication circuitry 66, and so forth) of the welding power supply 12 may be turned on, but the welding power output may not be delivered yet. For example, at this point in time, the engine 48 of the welding power supply 12 may not yet be powered on. At this point in time, if the user turns on the wireless remote control device 30 that is paired to the welding power supply 12, and initiates a command to start the engine 48 of the welding power supply 12 (or any other control command), then the wireless remote control device 30 is automatically set as the prioritized control device, the control panel 14 of the welding power supply 12 is automatically locked out from controlling all operating parameters of the welding power supply 12, except to turn the welding power supply 12 off, and all control of the welding power supply 12 is passed to the wireless remote control device 30. In certain embodiments, instead of being locked out from controlling all operating parameters of the welding power supply 12, only a certain subset of available operating parameters (e.g., a certain plurality of operating parameters, only one operating parameter, and so forth) of the welding power supply 12 may be locked from being controlled from the control panel 14 of the welding power supply 12.

If instead of initiating a command to start the engine 48 of the welding power supply 12 (or any other control command) from the wireless remote control device 30, the user uses the control panel 14 of the welding power supply 12 to start the engine 48 (or issue any other control command), then the control panel 14 of the welding power supply 12 is automatically set as the prioritized control device, the wireless remote control device 30 is locked out from controlling all operating parameters of the welding power supply 12, except to turn the welding power supply 12 off, and all control of the welding power supply 12 is passed to the control panel 14 of the welding power supply 12. In certain embodiments, instead of being locked out from controlling all operating parameters of the welding power supply 12, only a certain subset of available operating parameters (e.g., a certain plurality of operating parameters, only one operating parameter, and so forth) of the welding power supply 12 may be locked from being controlled from the wireless remote control device 30.

In other words, in certain embodiments, after the welding power supply 12 is turned on (e.g., changed from a powered off state to a powered on state), the first of the control panel 14 of the welding power supply 12 and a paired wireless remote control device 30 to attempt to issue a control command for the welding power supply 12 becomes the prioritized control device, with the other device becoming locked out until further action is taken (e.g., actively changing the prioritization via either the control panel 14 of the welding power supply 12 or the wireless remote control device 30). For example, in certain embodiments, the user may override the prioritization between the wireless remote control device 30 and the control panel 14 of the welding power supply 12 by interacting with whichever device is currently the prioritized control device (i.e., in essence, giving prioritization to the non-prioritized device). In addition, in certain embodiments, the prioritization of control between the control panel 14 of the welding power supply 12 and the wireless remote control device 30 may be re-initialized by powering the welding power supply 12 off and then powering it back on again.

As described above, while many of the operating parameters (e.g., welding voltage, welding current, and so forth) may not be modified by the non-prioritized control device (e.g., whichever of the control panel 14 of the welding power supply 12 and the wireless remote control device 30 is not the prioritized control device), the one particular operating status of turning off the welding power supply 12 may be modified. As such, as used herein, whether the welding power supply 12 (or any of its components, such as the engine 48) is turned on or off is referred to as an operating status instead of an operating parameter.

Therefore, instead of requiring a user to manually switch prioritization of control between the control panel 14 of the welding power supply 12 and the wireless remote control device 30, the embodiments described herein enable automatic prioritization based on the actions of the user. Furthermore, the embodiments described herein enable the device that is not currently the prioritized control device to be locked out from controlling the welding power supply 12, thereby providing tighter control of the welding power supply 12. In addition, operation of the welding power supply 12 is easily changed between local control (e.g., via the control panel 14 of the welding power supply 12) and remote control (e.g., via the wireless remote control device 30) without changing wired connections.

In addition, it should be noted that in certain embodiments, dual controls (i.e., enabling control from both the wireless remote control device 30 and a separate wired remote control device) may be enabled. For example, in certain embodiments, changing to this dual control mode may be configurable under software control. As illustrated in FIG. 4, an example of this type of dual control may be when a wired accessory 132, such as a foot pedal, is connected to an accessory connector 134 (e.g., a multi-pin connector, such as a 14-pin connector) of the welding power supply 12, and both the wired accessory 132 and the wireless remote control device 30 are used to control the welding power supply 12. In such a situation, the operator may desire to use the wired accessory 132 when welding in a TIG welding process (e.g., to finely control the welding current), but use the wireless remote control device 30 for other features. It will be appreciated that any type of welding power supply 12, line-powered, engine-driven, or otherwise, may utilize the prioritization techniques described herein in conjunction with the wireless remote control device 30.

In certain embodiments, the control panel 14 of the welding power supply 12 is connected to the controller 60 of the welding power supply 12 via an internal RS-485 serial data connection 136 and appears as a terminal to the controller 60. In certain embodiments, the wireless communication circuitry 66 includes a "gateway" circuit 138 that provides relays to control the engine starting process, a mating radio system to communicate with the wireless remote control device 30, and a connection to the internal RS-485 serial data connection 136. The gateway circuit 138 of the wireless communication circuitry 66 appears as another terminal to the controller 60, which selects either, but not both, terminals (e.g., the internal RS-485 serial data connection 136 and the gateway circuit 138 of the wireless communication circuitry 66) as controlling for the welding power supply 12. As described above, the decision logic that selects either the control panel 14 of the welding power supply 12 or the wireless remote control device 30 is determined when the welding power supply 12 is turned on.

In addition to using secure measures, such as the security keys, to ensure that the welding power supply 12 and the wireless remote control device 30 communicate wirelessly with each other, embodiments described herein may utilize a messaging protocol system that facilitates structured data transmission. In particular, in certain embodiments, a messaging protocol that is based on the extensible markup language (XML) may be used, and the data packets that are sent between the welding power supply 12 and the wireless remote control device 30 may conform to this protocol. As will be appreciated, in XML, messages have a header structure with a "Tag" and a "Variable". An example is a message line with a Tag of "COLOR" and a Variable of "BLUE". As described herein, an additional attribute that is associated with each Tag-Variable combination is "Unit" so that the transmitted data includes an associated unit, such as Temperature, Voltage, Current, and so forth. Thus, the structured data format that may be implemented herein may be referred to as TUV (Tag-Unit-Variable). Using the TUV data structures, a library of message elements may be built, which can be added together in a string to construct data and commands for remote control of the welding power supply 12 via the wireless remote control device 30.

In addition, in certain embodiments, a unique programmable graphical user interface (GUI) may be implemented that allows the wireless remote control device 30 to pair to any welding power supply 12 with a unique graphic symbol set and nested menu structure, as described herein, thereby allowing all controllable features of the paired wireless remote control device 30 and welding power supply 12 to be controlled and modified. In particular, as opposed to using similar graphical user interfaces on the wireless remote control device 30 and the welding power supply 12 that merely display text and numeric displays, the embodiments described herein enable sharing between the wireless remote control device 30 and the welding power supply 12 of graphic symbols, written instructions, and programmable features, such as the display of common virtual control elements, such as the virtual buttons and virtual slider elements described with respect to FIGS. 5 through 9. Using these nested menus facilitates provision of all of the functions (and even more functions) that are available on the control panel 14 of the welding power supply 12 on the wireless remote control device 30 as well, while not requiring exact one-to-one duplication of the exact look and feel of the control panel 14 of the welding power supply 12.

In certain embodiments, power saving (or "green") features are implemented, such as using the radio interface electronics (e.g., the wireless communication circuitry 66) of the welding power supply 12 to turn off the power in the welding power supply electronics (e.g., the controller 60) of the welding power supply 12 after periods of non-use of the welding power supply 12, leaving the radio subsystem of the wireless communication circuitry 66 in a supervisory role. In this supervisory role, the radio sub-circuitry of the wireless communication circuitry 66 enters a sleep mode after turning the power of the welding power supply 12 off, thus saving on battery power. In this sleep mode, the radio subsystem of the wireless communication circuitry 66 periodically awakens for very short periods to monitor radio traffic (e.g., to determine whether an operator wants to re-start the welding functionality of the welding power supply 12). In addition, in this sleep mode, the average current consumption may be in the low micro-amp region. It will be appreciated that any type of welding power supply 12, line-powered, engine-driven, or otherwise, may utilize the power-saving features described herein.

In certain embodiments, a user may also actively place the welding power supply 12 and/or the wireless remote control device 30 into the sleep mode. For example, in certain embodiments, a user may place the wireless remote control device 30 into a sleep mode by selecting a sleep option via the display 32 of the wireless remote control device 30, and the network interface 44 of the wireless remote control device 30 may send a control signal to the wireless communication circuitry 66 of the welding power supply 12 to place the welding power supply 12 into a sleep mode. In response, the controller 60 of the welding power supply 12 may either place the welding power supply 12 into the sleep mode, or present an option to the user via the control panel 14 of the welding power supply 12 to place the welding power supply 12 in the sleep mode or leave the welding power supply 12 in the normal operating mode.

Conversely, in certain embodiments, a user may place the welding power supply 12 into a sleep mode by selecting a sleep option via the control panel 14 of the welding power supply 12, and the wireless communication circuitry 66 of the welding power supply 12 may send a control signal to the network interface 44 of the wireless remote control device 30 to place the wireless remote control device 30 into a sleep mode. In response, the processor 38 of the wireless remote control device 30 may either place the wireless remote control device 30 into the sleep mode, or present an option to the user via the display 32 of the wireless remote control device 30 to place the wireless remote control device 30 in the sleep mode or leave the wireless remote control device 30 in the normal operating mode.

Once the welding power supply 12 and/or the wireless remote control device 30 is placed into a sleep mode, detection of activity on either the welding power supply 12 or the wireless remote control device 30 may cause the respective device (i.e., either the welding power supply 12 or the wireless remote control device 30) to wake from the sleep mode (i.e., resume the normal operating mode), and send a control signal to the other device to wake the other device from a sleep mode (if, in fact, the other device is in the sleep mode).

In certain embodiments, the last used operating conditions for the welding power supply 12 may be stored in the welding power supply 12 and/or the wireless remote control device 30. For example, when the welding power supply 12 is shut down, the last control settings, such as the selected welding process (e.g., stick, DC, and so forth) with selectable parameters (e.g., current/voltage settings, arc stiffness settings, and so forth) may be stored in the memory 64 of the controller 60 of the welding power supply 12 and/or in the memory 40 or the storage 42 of the wireless remote control device 30. In this manner, when re-started, the welding power supply 12 may resume with the same settings as most recently used, thereby saving the operator the time of re-setting the welding power supply 12 for the same work. It will be appreciated that any of the operating parameters and statuses described herein may be stored for later use in this manner.

Furthermore, in certain embodiments, user-preferred welding settings may be stored in wireless remote control device 30 and, in certain instances, in the welding power supply 12. For example, an operator may be welding on differing steel gauges of sheet metal using a MIG welding process. In this scenario, the operator may select the preferred process from a short menu that may be programmed, as needed, to save up to a predetermined number of selections, which may be stored in the memory 40 or the storage 42 of the wireless remote control device 30 and, in certain instances, in the memory 64 of the controller 60 of the welding power supply 12. These user-preferred settings may be referred to as "welding presets." It will be appreciated that any of the controllable operating parameters described herein may be stored as welding presets for later use in this manner, and that any type of welding power supply 12, line-powered, engine-driven, or otherwise, may utilize such welding presets.

In certain embodiments, the software or firmware of the wireless remote control device 30 may include a "find" function so that if the wireless remote control device 30 is misplaced, it will have either or both of a visual indicator or an audio indicator that can be activated to indicate the location of the wireless remote control device 30 to the user. In certain embodiments, the wireless remote control device 30 may include a flashing lamp or a flashing display backlight that may be illuminated. For example, as illustrated in FIG. 11, in certain embodiments, the wireless remote control device 30 may include a separate light emitting diode 140 that may be illuminated (or pulsed) to indicate the location of the wireless remote control device 30. In other embodiments, the display 32 of the wireless remote control device 30 itself may be illuminated to indicate the location of the wireless remote control device 30. For example, when the find function is activated (e.g., when a user selects the find function via the control panel 14 of the welding power supply 12, thereby sending a control signal to the wireless remote control device 30), the light level of the display 32 of the wireless remote control device 30 may be pulsed in order to create pulsating light to facilitate identification of the location of the wireless remote control device 30. In other embodiments, the wireless remote control device 30 may be configured to activate an audio indicator 142 (e.g., a buzzer, speaker, piezo transducer, and so forth), which may be internal to the wireless remote control device 30, to facilitate identification of the location of the wireless remote control device 30.

In certain embodiments, the find function may be activated by selecting the find function via the control panel 14 of the welding power supply 12. Once the find function is activated by the user, a signal may be sent wirelessly to the wireless remote control device 30, and the wireless remote control device 30 may activate the light emitting diode 140 and/or the display 32 and/or the audio indicator 142 to cause the visual and/or audio indication to be activated on the wireless remote control device 30 to facilitate identification of the location of the wireless remote control device 30. Alternatively, in certain embodiments, the wireless remote control device 30 itself may initiate activation of the find function in the event, for example, that the wireless remote control device 30 loses its wireless connection to the welding power supply 12 via the communication network 122. For example, in certain embodiments, if the wireless remote control device 30 is moved to a location outside of a wireless communication range with the welding power supply 12 via the communication network 122, the wireless remote control device 30 may cause the visual and/or audio indicators to be activated, thereby alerting nearby users that the wireless remote control device 30 should be brought back into the wireless communication range with the welding power supply 12 to which it is paired.

The embodiments described herein allow for complete flexibility in programming a wireless remote control device 30 such that every feature of a welding power supply 12 to which the wireless remote control device 30 is paired may be controlled, not merely a few weld parameters. In addition, in using the wireless remote control device 30 to control the welding power supply 12, the operator does not need to physically see the control panel 14 of the welding power supply 12 and, thus, can be located as far from the welding power supply 12 as the permissible length of the weld cables, such as cables 18, 22 as long as the wireless remote control device 30 is within a wireless communication range of the wireless communication network 122. In addition, the welding power supply 12 may be shut off when weld current is not required, saving fuel, such as when material is being moved, etc.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding power supply comprising:
a housing comprising a control panel configured to receive inputs from an operator;
a generator disposed within the housing and configured to generate power;
an engine disposed within the housing and configured to drive the generator;
power conversion circuitry disposed within the housing and configured to convert the power generated by the generator into output power for a welding operation; and
local control circuitry disposed within the housing and configured to wirelessly receive a control signal from remote control circuitry of a portable electronic device, and to control the welding power supply based at least in part on the received control signal;
wherein the local control circuitry is configured to set prioritization of control of the welding power supply between the portable electronic device and the control panel of the welding power supply, to prevent the control panel from controlling at least one parameter of the welding power supply when the portable electronic device is prioritized, and to prevent the portable electronic device from controlling the at least one parameter of the welding power supply when the control panel is prioritized.

2. The welding power supply of claim 1, wherein the remote control circuitry comprises a radio subsystem configured to wirelessly send and receive control signals to and from the local control circuitry using a signaling protocol.

3. The welding power supply of claim 1, wherein the local control circuitry is configured to wirelessly receive a control signal from the remote control circuitry to start the engine, and to start the engine based at least in part on the received control signal.

4. The welding power supply of claim 1, wherein the local control circuitry is configured to wirelessly receive a control signal from the remote control circuitry to stop the engine, and to stop the engine based on the received control signal.

5. The welding power supply of claim 1, wherein the local control circuitry is configured to wirelessly receive a control signal from the remote control circuitry to control a speed of the engine, and to control the speed of the engine based at least in part on the received control signal.

6. The welding power supply of claim 1, wherein the local control circuitry is configured to wirelessly receive a control signal from the remote control circuitry to control an engine run mode of the engine, and to control the engine run mode based at least in part on the received control signal.

7. The welding power supply of claim 1, wherein the portable electronic device comprises a display, the local control circuitry is configured to wirelessly send data relating to a fuel level of the engine to the remote control circuitry, and the remote control circuitry is configured to display the data on the display.

8. The welding power supply of claim 1, wherein the portable electronic device comprises a display, the local control circuitry is configured to wirelessly send data relating to a time to scheduled oil change for the engine to the remote control circuitry, and the remote control circuitry is configured to display the data on the display.

9. The welding power supply of claim 1, wherein the portable electronic device comprises a display, the local control circuitry is configured to wirelessly send data relating to total hours of use of the engine to the remote control circuitry, and the remote control circuitry is configured to display the data on the display.

10. The welding power supply of claim 1, wherein the portable electronic device comprises a display, the local control circuitry is configured to wirelessly send data relating to total hours of use of the welding power supply to the remote control circuitry, and the remote control circuitry is configured to display the data on the display.

11. The welding power supply of claim 1, wherein the portable electronic device comprises a display, the local control circuitry is configured to wirelessly send data relating to diagnostic messages or diagnostic codes for the welding power supply to the remote control circuitry, and the remote control circuitry is configured to display the data on the display.

12. The welding power supply of claim 1, wherein the portable electronic device comprises a display, the local control circuitry is configured to wirelessly send data relating to engine diagnostic messages or engine diagnostic codes for the engine to the remote control circuitry, and the remote control circuitry is configured to display the data on the display.

13. The welding power supply of claim 1, wherein the local control circuitry is configured to facilitate access by the remote control circuitry to an engine serial data bus of the engine.

14. The welding power supply of claim 1, wherein the local control circuitry is configured to wirelessly receive a control signal from the remote control circuitry to control an operating parameter or status of an air compressor of the welding power supply, and to control the operating parameter or status based at least in part on the received control signal.

15. The welding power supply of claim 1, wherein the local control circuitry is configured to wirelessly receive a control signal from the remote control circuitry to control an operating parameter or status of a hydraulic pump of the welding power supply, and to control the operating parameter or status based at least in part on the received control signal.

16. The welding power supply of claim 1, wherein the portable electronic device comprises a display, and the local control circuitry is configured to wirelessly send instructions to the remote control circuitry to display a nested graphical hierarchical structure of operating parameters and statuses of the welding power supply via the display.

17. The welding power supply of claim 1, wherein the remote control circuitry is configured to place the portable electronic device in a sleep mode, and to wirelessly send a control signal to the local control circuitry to place the welding power supply in a sleep mode while maintaining network pairing between the portable electronic device and the welding power supply.

18. The welding power supply of claim 17, wherein the remote control circuitry is configured to wake the portable electronic device from the sleep mode upon detection of activity on the portable electronic device, and to wirelessly send a control signal to the local control circuitry to wake the welding power supply from a sleep mode upon the detection of the activity on the portable electronic device.

19. The welding power supply of claim 17, wherein the local control circuitry is configured to wake the welding power supply from a sleep mode upon detection of activity on the welding power supply, and to wirelessly send a control signal to the remote control circuitry to wake the portable electronic device from the sleep mode upon the detection of the activity on the welding power supply.

20. The welding power supply of claim 1, wherein the local control circuitry is configured to place the welding power supply in a sleep mode, and to wirelessly send a control signal to the remote control circuitry to place the portable electronic device in a sleep mode while maintaining network pairing between the portable electronic device and the welding power supply.

21. The welding power supply of claim 20, wherein the local control circuitry is configured to wake the welding power supply from the sleep mode upon detection of activity on the welding power supply, and to wirelessly send a control signal to the remote control circuitry to wake the portable electronic device from a sleep mode upon the detection of the activity on the welding power supply.

22. The welding power supply of claim 20, wherein the remote control circuitry is configured to wake the portable electronic device from a sleep mode upon detection of activity on the portable electronic device, and to wirelessly send a control signal to the local control circuitry to wake the welding power supply from the sleep mode upon the detection of the activity on the portable electronic device.

23. The welding power supply of claim 1, wherein the portable electronic device comprises a memory medium, the local control circuitry is configured to wirelessly send data relating to one or more operating parameters and statuses of the welding power supply to the remote control circuitry for storage in the memory medium, and the remote control circuitry stores the data in the memory medium.

24. The welding power supply of claim 23, wherein the welding power supply comprises a memory medium, and the local control circuitry stores the data in the memory medium of the welding power supply.

25. The welding power supply of claim 1, wherein the portable electronic device comprises a memory medium, the local control circuitry is configured to wirelessly send data relating to a user-preferred welding process parameter for the welding power supply to the remote control circuitry for storage in the memory medium, and the remote control circuitry stores the data in the memory medium.

26. The welding power supply of claim 25, wherein the welding power supply comprises a memory medium, and the local control circuitry stores the data in the memory medium of the welding power supply.

27. The welding power supply of claim 1, wherein the local control circuitry and the remote control circuitry are configured to bi-directionally communicate information relating to a preset value for a parameter of the welding power supply, wherein the bi-directional communication includes only digital communication.

28. The welding power supply of claim 1, wherein the local control circuitry is configured to wirelessly receive a control signal from the remote control circuitry to change a welding process type of the welding power supply, and to change the welding process type based on the received control signal.

29. The welding power supply of claim 1, wherein the local control circuitry is configured to wirelessly receive a control signal from the remote control circuitry to change a current of the welding operation, and to change the current of the welding operation based at least in part on the received control signal.

30. The welding power supply of claim 1, wherein the local control circuitry is configured to wirelessly receive a control signal from the remote control circuitry to change a voltage of the welding operation, and to change the voltage of the welding operation based at least in part on the received control signal.

31. The welding power supply of claim 1, wherein the local control circuitry is configured to wirelessly receive a control signal from the remote control circuitry to add advanced welding process functionality to the welding power supply, and to add the advanced welding process functionality based on the received control signal.

32. The welding power supply of claim 1, wherein the local control circuitry is configured to wirelessly receive a control signal from the remote control circuitry to change a welding arc control parameter of the welding power supply, and to change the welding arc control parameter based on the received control signal.

33. The welding power supply of claim 1, wherein the local control circuitry is configured to wirelessly receive a control signal from the remote control circuitry to change a polarity of a welding process of the welding power supply, and to change the polarity of the welding process based on the received control signal.

34. The welding power supply of claim 1, wherein the local control circuitry is configured to wirelessly receive a control signal from the remote control circuitry to change an operating status of a welding output of the welding power supply, and to change the operating status of the welding output based on the received control signal.

35. The welding power supply of claim 1, wherein the local control circuitry is configured to wirelessly send a control signal to the remote control circuitry to indicate a location of the portable electronic device, and the remote control circuitry is configured to indicate the location of the portable electronic device by activating an indicator on the portable electronic device.

36. The welding power supply of claim 1, wherein the portable electronic device is a cellular phone.

37. The welding power supply of claim 1, wherein the portable electronic device is a laptop computer.

38. The welding power supply of claim 1, wherein the portable electronic device is a tablet computer.

39. The welding power supply of claim 1, wherein the portable electronic device is a dedicated original equipment manufacturer (OEM) remote control device.

40. The welding power supply of claim 1, wherein the local control circuitry is configured to automatically start or automatically stop the engine based at least in part on detection of an event occurring in the welding power supply or a device coupled to the welding power supply.

41. The welding power supply of claim 40, wherein the local control circuitry is configured to automatically start the engine when a stick welding rod touches a grounded surface.

42. The welding power supply of claim 40, wherein the local control circuitry is configured to automatically start the engine when a welding arc is detected.

43. The welding power supply of claim 40, wherein the local control circuitry is configured to automatically start the engine when a trigger of a metal inert gas (MIG) welding torch is pressed.

44. The welding power supply of claim 40, wherein the local control circuitry is configured to automatically start the engine when a foot pedal is depressed.

45. The welding power supply of claim 40, wherein the local control circuitry is configured to automatically start the engine when a tungsten inert gas (TIG) welding torch touches a grounded surface.

46. The welding power supply of claim 40, wherein the local control circuitry is configured to automatically start the engine when an auxiliary load is detected.

47. The welding power supply of claim 40, wherein the local control circuitry is configured to automatically start the engine upon detection of a change in pressure in a compressor of the welding power supply.

48. The welding power supply of claim 40, wherein the local control circuitry is configured to automatically start the engine upon detection of a change in pressure in a hydraulic pump of the welding power supply.

49. The welding power supply of claim 40, wherein the local control circuitry is configured to automatically start the engine when a power level of a battery of the welding power supply falls below a predetermined threshold.

50. The welding power supply of claim 40, wherein the local control circuitry is configured to automatically stop the engine after a given amount of time without activity in the welding power supply.

51. A welding power supply comprising:
a generator configured to generate power;
an engine configured to drive the generator;
power conversion circuitry configured to convert the power generated by the generator into output power for a welding operation;
a control panel configured to receive inputs from an operator; and
local control circuitry configured to wirelessly receive a control signal from remote control circuitry of a portable electronic device, and to control the welding power supply based at least in part on the received control signal;
wherein the local control circuitry is configured to set prioritization of control of the welding power supply between the portable electronic device and the control panel of the welding power supply, to prevent the control panel from controlling at least one parameter of the welding power supply when the portable electronic device is prioritized, and to prevent the portable electronic device from controlling the at least one parameter of the welding power supply when the control panel is prioritized.

* * * * *